INVENTORS
B. J. FALANGA
R. A. MANNING
Z. T. SYLVESTER

ATTORNEY

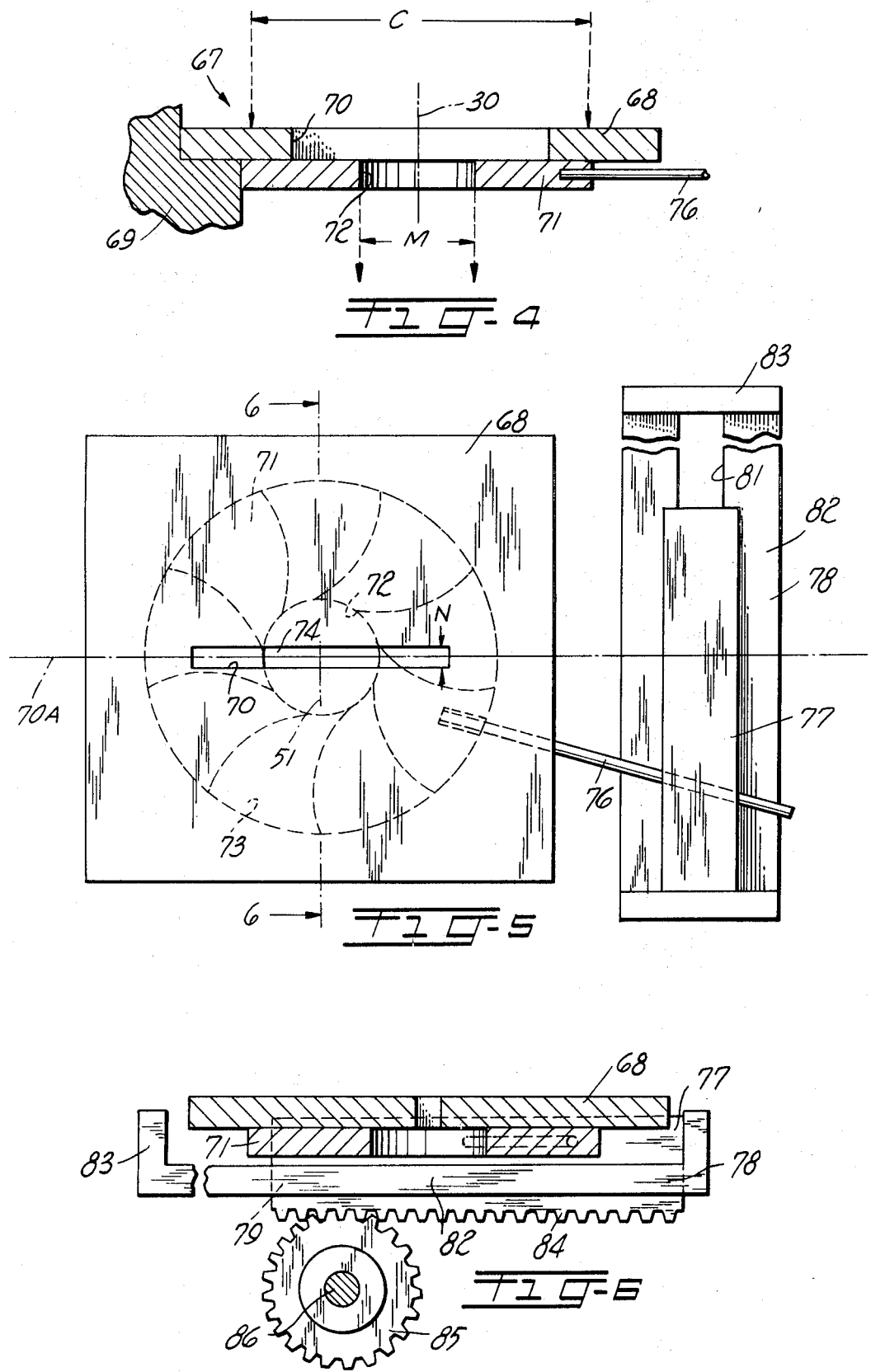

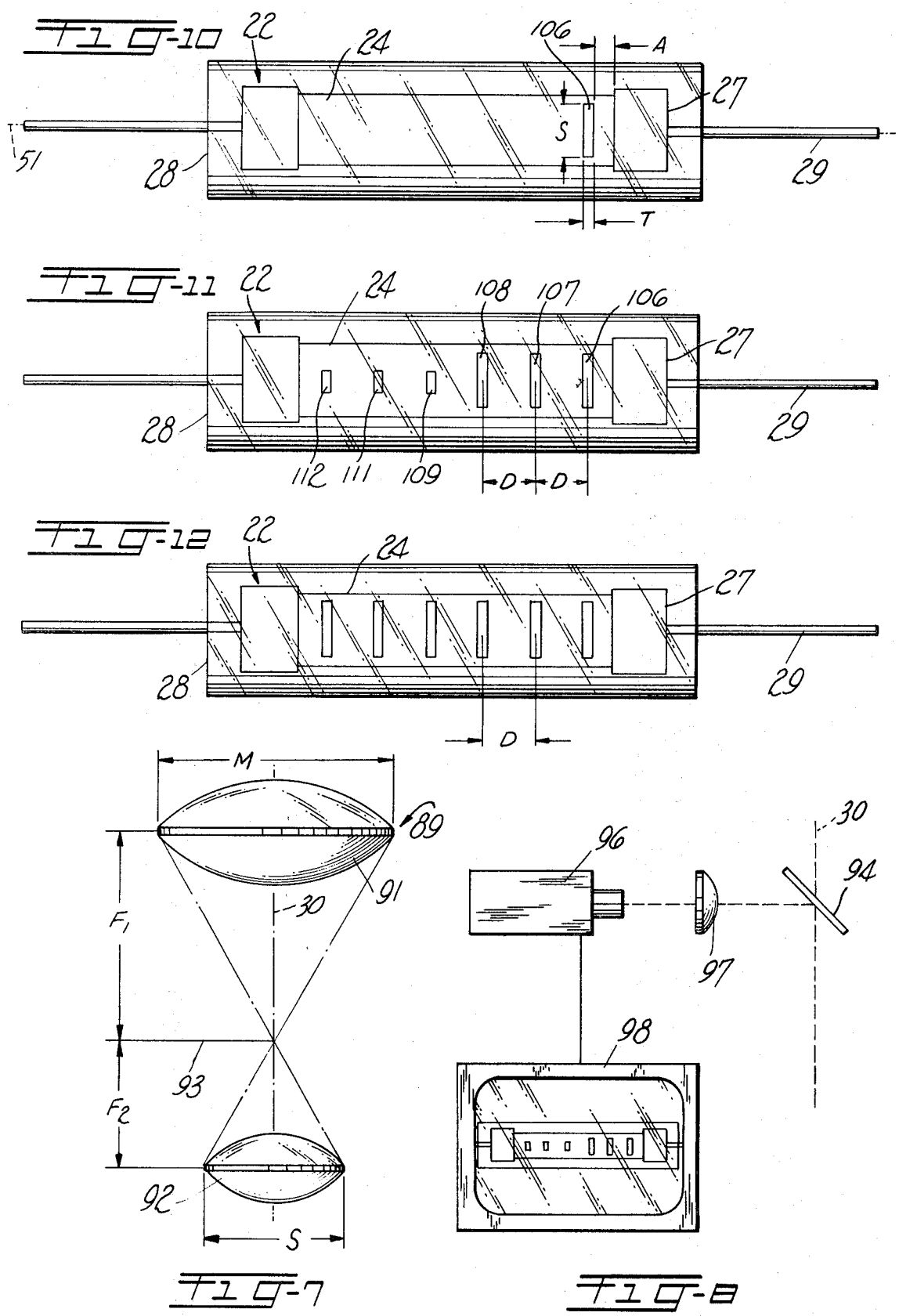

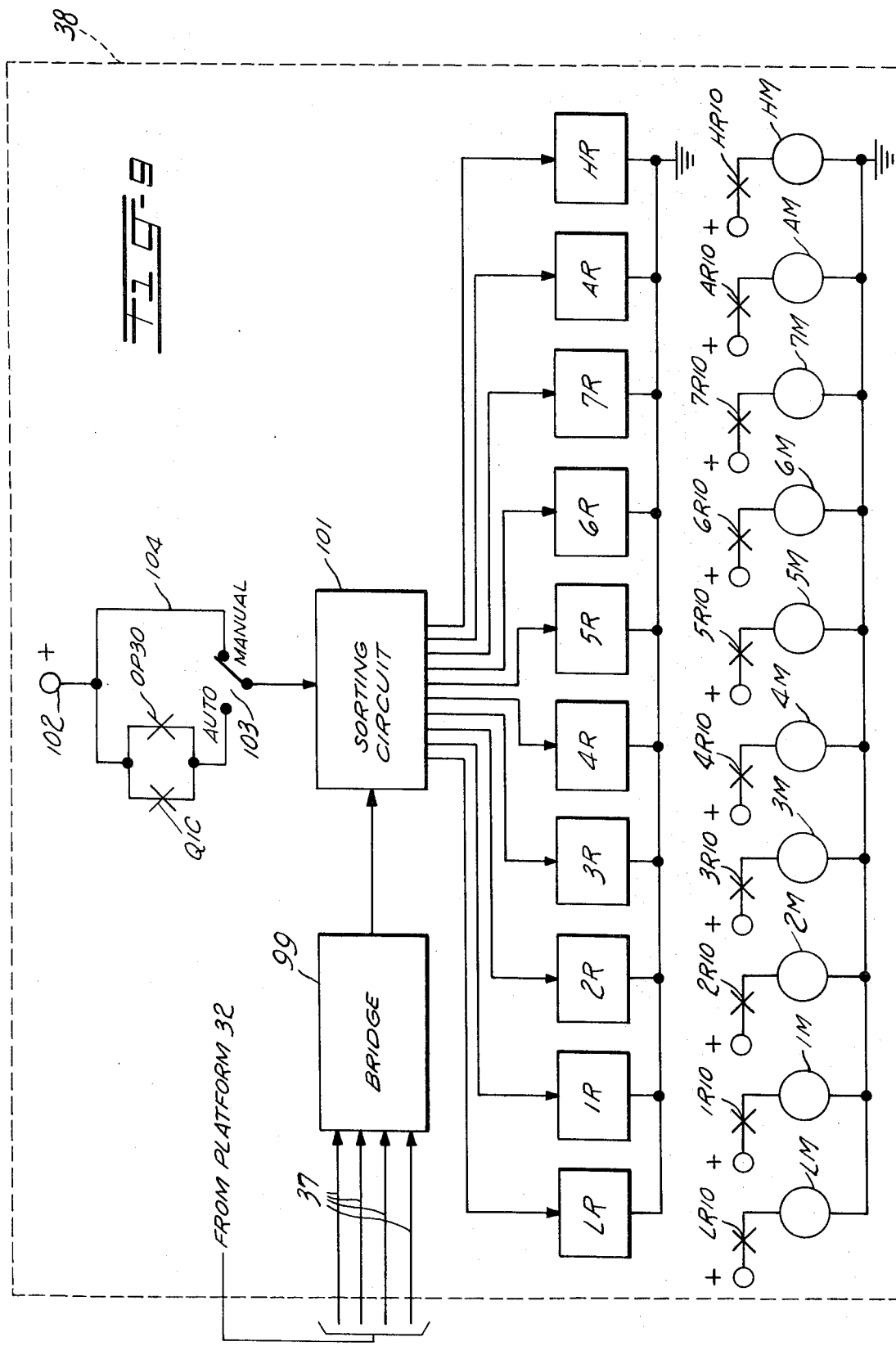

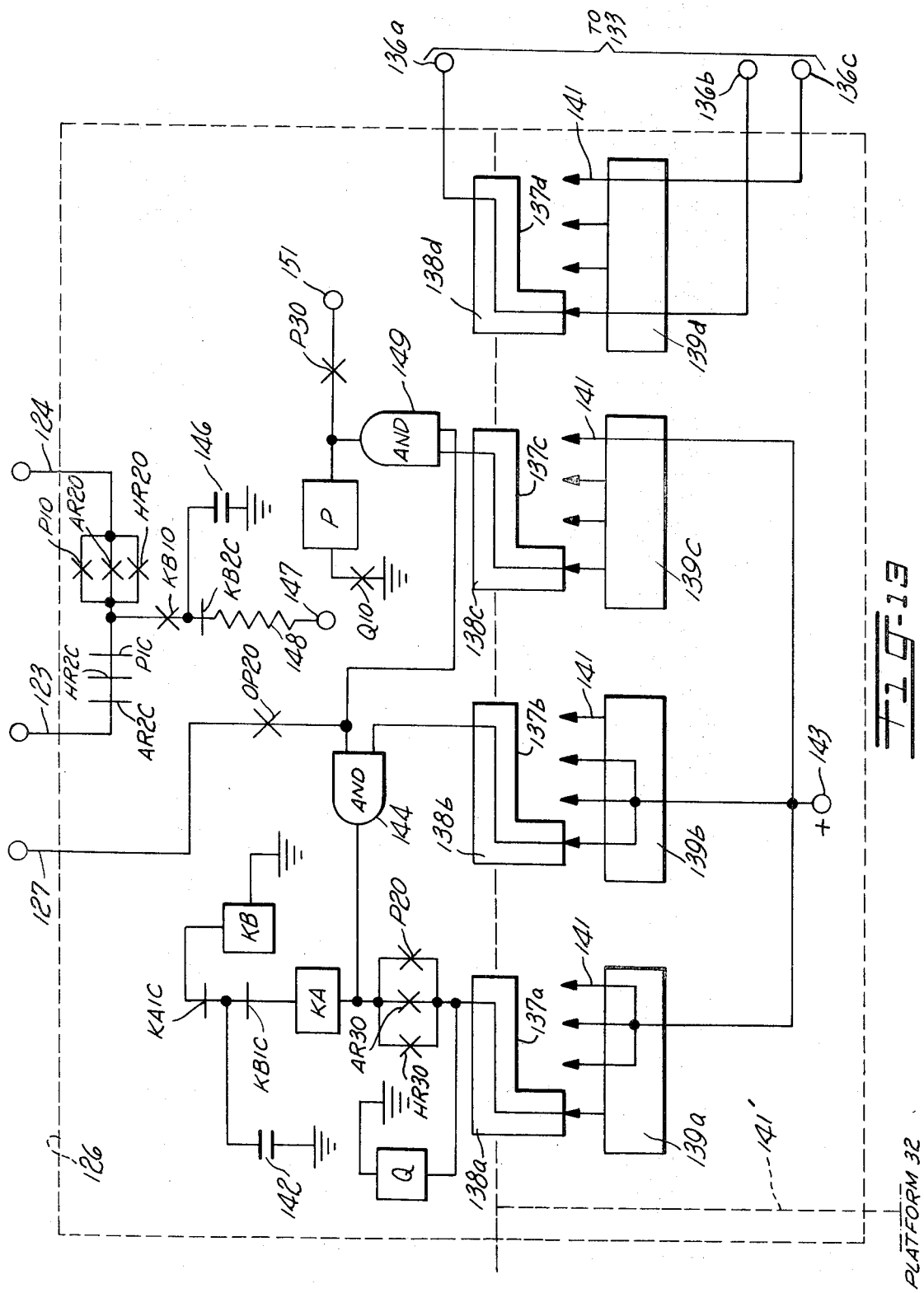

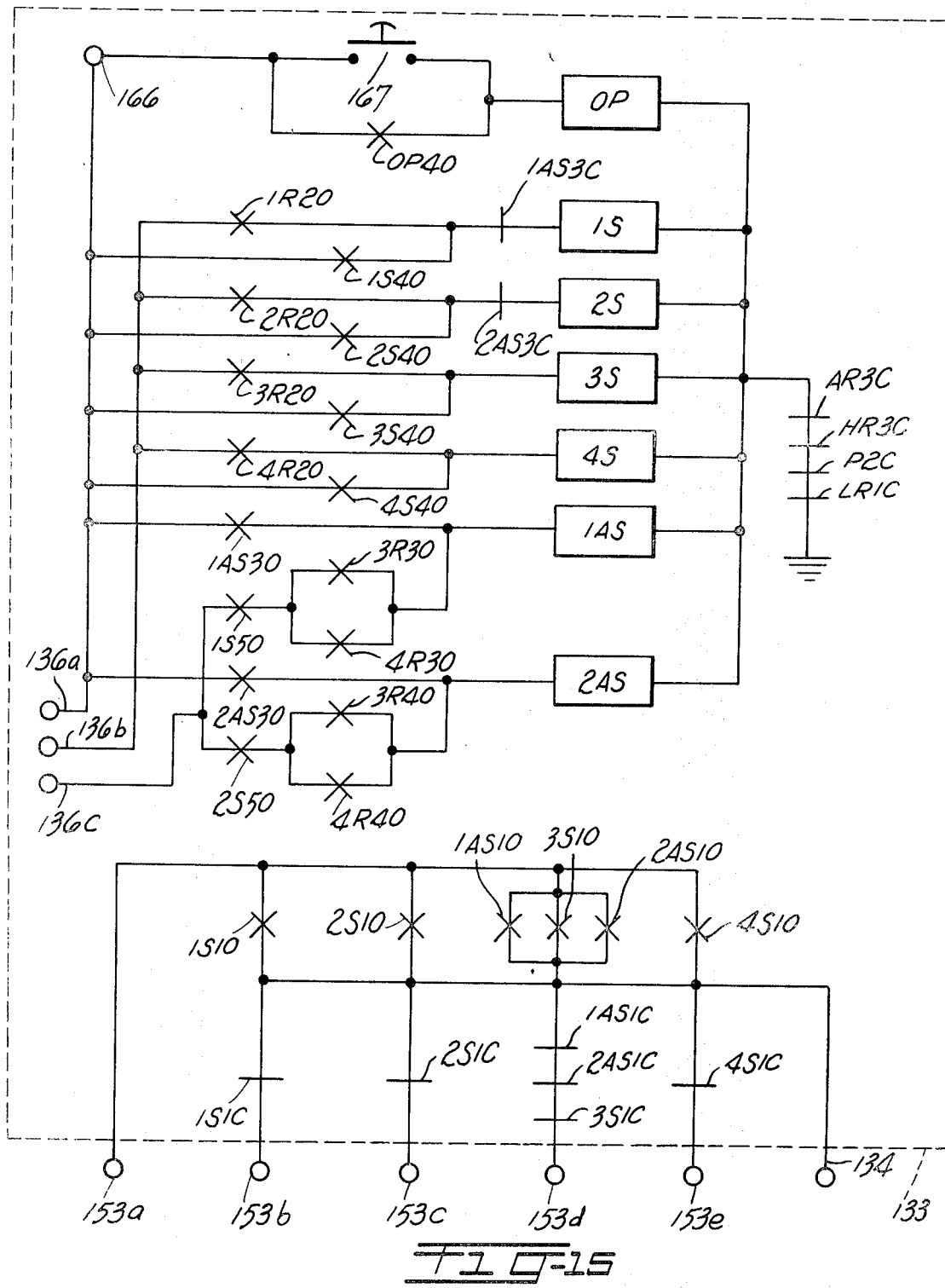

United States Patent Office 3,535,778
Patented Oct. 27, 1970

3,535,778
OPTICAL TRIMMING OF COATED FILM RESISTORS
Bruno J. Falanga, Lawrence, Robert A. Manning, Boxford, and Zoel T. Sylvester, Danvers, Mass., assignors to Western Electric Company, Incorporated, New York, N.Y., a corporation of New York
Filed Mar. 27, 1968, Ser. No. 716,658
Int. Cl. H01c 17/00
U.S. Cl. 29—610     15 Claims

ABSTRACT OF THE DISCLOSURE

A wide range of undervalued deposited carbon resistors may be trimmed to a desired nominal value by employing a relatively small number of elongated strip-shaped laser beam pulses to evaporate a corresponding number of axially spaced strips of carbon from the resistor core. One beam dimension is oriented perpendicular to the resistor axis and is made adjustable in discrete steps to accommodate resistors initially falling in different ranges below the desired value. Provision is made to selectively decrease this beam dimension during the trimming operation to prevent overtrimming of resistors initially falling in the ranges most remote from the nominal value.

Background of the invention

The use of precision, glass-encapsulated deposited carbon resistor in communications work has been widespread in recent years and large quantities of such resistors have been produced. In the manufacture of such devices it is common to initially produce, in bulk, undervalued resistors which fall within a production tolerance of about 15% of a desired nominal value by controlling the rate of carbon deposition. Subsequently, the resistance of each such element is increased to within a prescribed small deviation (i.e., to within a precision tolerance) of the desired nominal value by "trimming," i.e., by selectively removing carbon from the coated resistor core.

Several methods of trimming coated film resistors from their production tolerance to a desired precision tolerance are now available. In one technique, the film is rubbed or machined from the core of the encapsulated resistor until the latter reaches the desired value, after which the resistor is thermally aged and encapsulated. In a second and more sophisticated technique, a combination of mechanical and optical procedures are used. This latter arrangement (which has been used primarily in trimming metal film resistors in which the coating is disposed on the inside of a glass tube), a portion of the film is initially machined from the inside of the tube in a spiral path until the resistance of the element has almost come within its precision tolerance; the tube is then aged and sealed. After sealing, the resistor is brought into precision tolerance by evaporating additional minute increments of film along substantially the same spiral path with the use of overlapping, high power laser beam pulses (i.e., laser shots) directed at the film through the glass tube.

One principal problem with the purely mechanical technique is that, as a result of thermal aging and encapsulation, a significant portion of the previously trimmed resistors fall out of their precision tolerance. Moreover, the customized mechanical trim itself is time consuming and expensive. This latter problem is also applicable, of course, to the mechanical portion of the newer composite trimming procedure.

The optical portion of the newer technique effectively avoids the deleterious effect of thermal aging and encapsulation on resistor accuracy, since the trim is not completed until after sealing. However, it must be recognized that the existing optical technique is basically only a tool for completing the manufacture of production-tolerance resistors that have already been brought to virtual uniformity by prior machining, so that only a relatively few overlapping laser beam pulses are contemplated to complete the trim. Without the use of such premachining, a tremendous and therefore impractical number of laser shots would be required where the resistors initially deviate by 15%, 10%, or even 5% from their desired nominal value. It follows that as a practical matter, the optical technique cannot be used satisfactorily without prior machining except where the initial resistance of the element happens to fall just below the lower limit of the precision tolerance.

Moreover, any attempt to use the overlapping spot technique of the existing optical arrangement in the trimming of deposited carbon resistors presents additional difficulties because of the nature of the resistor construction itself. Unlike those metal film resistors whose coating is disposed on the inside of a glass tube, the core and the encapsulating jacket of a deposited carbon resistor are separate units, with the former being disposed inside and spaced from the latter. Each laser beam pulse directed against the resistor core in such a case may cause a portion of the carbon evaporated from the core to redeposit on the overlying portion of the glass jacket. Thus, if the next laser shot overlaps the previous one, as contemplated in the previous arrangement, the carbon redeposited on the glass jacket during one shot may be locally heated by the next shot and the adjacent portion of the glass may be damaged.

The problem treated by the present invention is that of providing a purely optical technique for quickly and safely trimming a wide range of undervalued deposited carbon resistors (i.e., those initially deviating by up to 15% from the desired nominal value) to precision tolerances without the necessity of mechanical film removal prior to encapsulation.

Summary of the invention

The techniques and apparatus of the present invention permit the trimming of encapsulated coated film resistors that initially occupy any one of N resistance ranges between the production tolerance and the lower limit of the precision tolerance with the use of relatively few laser beam pulses and without damage to the glass encapsulation. In a preferred embodiment, the cross section of the nominally circular optical beam from the laser source is altered into a slot-like configuration for evaporating a correspondingly shaped strip of film from the core of a deposited carbon resistor. A first dimension of the beam cross section is made externally variable with the use of an adjustable iris. The shaped beam is directed at the resistor under test along a prescribed optical axis and is oriented so that the adjustable first dimension of the beam cross section extends perpendicular to the resistor axis.

The length of the first dimension of the beam is adjusted to a unique one of N successively smaller predetermined values respectively assigned to the N successively higher initial resistance ranges of the element to be trimmed. The N values are chosen so that resistors initially in the corresponding ranges may be brought into precision tolerance in at most several (illustratively six) laser shots.

Relative movement is imparted between the resistor and the optical beam after each laser shot so that the regions of the core to be vaporized are axially spaced, thereby precluding overlapping of the laser shots and the possibility of damage to the glass encapsulation.

Because of the orientation of the removed strip of carbon perpendicular to the resistor axis, a relatively large resistance change is obtained for a given area of film removal. In general, the increment increases in proportion to the length of the removed strip and, consequently, to the first dimension of the shaped beam. The removal of carbon strips from a succession of axially spaced core regions leads to successively diminishing increments of resistance from shot to shot and, therefore, to an accurately controllable convergence of resistance from any of the N ranges to the desired value. In order to provide greater control over the rate of convergence to prevent "overshooting" the desired value during the trim, provision is made for diminishing the first beam dimension from its initially preset value to a new value after a predetermined number of laser shots have occurred when a resistor initially in a prescribed, relatively low range has reached a prescribed, relatively high range.

Techniques are described for carrying out the trimming operation either under manual control or in a fully automatic manner.

The resistor core configuration resulting from a multishot trimming operation of the type indicated above exhibits an apertured coating of carbon that surrounds and defines an underlying plurality of axially spaced dielectric strips oriented in a direction perpendicular to the axis of the resistor. The strips will be coextensive except when the first beam dimension is changed during the trimming operation for the purpose indicated above.

Brief description of the drawing

The nature of the invention and its advantages will appear more fully from the following detailed description taken in conjunction with the appended drawing, in which:

FIGS. 4 and 5 are front elevation and plan views, respectively, of an adjustable optical beam shaping arrangement suitable for use in the apparatus of FIG. 1 and incorporating an adjustable iris;

FIG. 6 is a sestional side elevation, taken along line 6—6 of FIG. 5, illustrating means for adjusting the iris opening;

FIG. 7 is a front elevation of a pair of lenses for reducing the size of an optical beam;

FIG. 8 is a diagrammatic representation of a TV monitoring system for viewing a resistor being trimmed by the apparatus of FIG. 1;

FIG. 9 is a block and schematic diagram of a resistance classifier employed in the arrangement of FIG. 1;

FIG. 10 is a longitudinal view of a coated resistor core that has been exposed to a single laser shot in accordance with the invention;

FIG. 11 is a longitudinal view of a coated resistor core that has been exposed to a first pattern of laser shots in accordance with the invention, the later shots in the pattern having a smaller beam cross section than the earlier shots in the pattern;

FIG. 12 is a longitudinal view of a coated resistor core that has been exposed to a second pattern of laser shots in accordance with the invention, each of the shots having an identical beam cross section;

FIG. 13 is a schematic diagram of a resistor positioner suitable for use in the arrangement of FIG. 1;

FIG. 15 is a schematic diagram of a programmed controller suitable for use in the arrangement of FIG. 1.

Detailed description

Figure 1:
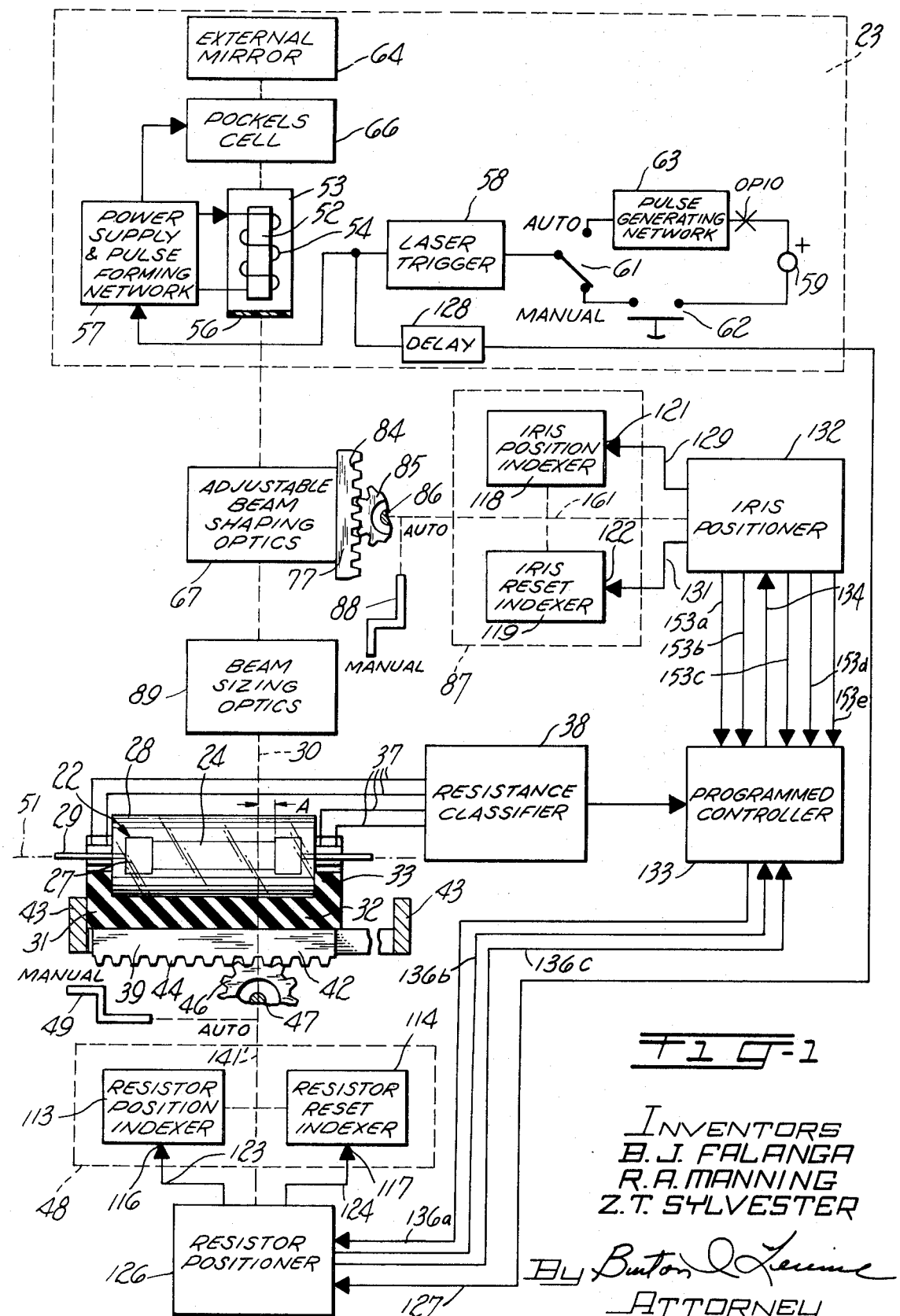
FIG. 1 is an overall diagrammatic representation of a resistor trimming apparatus constructed in accordance with the invention.

Referring now in more detail to the drawing, FIG. 1 shows pictorially one form of the invention for trimming the resistance of an undervalued coated film resistor 22 (illustratively a deposited carbon resistor) to a desired higher value. As explained in more detail below, such trimming is accomplished by evaporating selected film portions of the resistor with the aid of short duration, high intensity optical beam pulses from a suitable generator 23.

Figure 2:
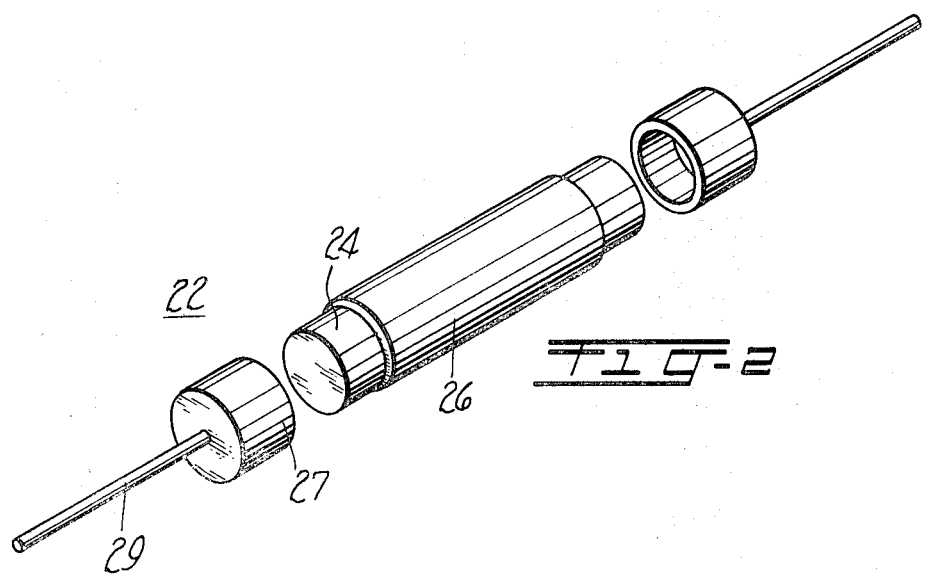
FIG. 2 is an exploded view of a deposited carbon resistor suitable for trimming with the arrangement of FIG. 1, the resistor encapsulation being omitted for clarity.

As shown best in FIG. 2, the resistor 22 (hereafter sometimes referred to as "the element 22") includes an elongated cylindrical dielectric core 24 formed from ceramic material or other suitable insulating dielectric. The periphery of the core 24 is coated, over a central portion thereof, with an ideally uniform layer 26 of an intermediate resistance material, illustratively carbon. (The term "intermediate resistance material" as used herein signifies a material whose resistance to electron flow is lower than that of an insulating dielectric such as the core material but higher than that of a conductor. Nichrome and Tantalum are examples of other suitable intermediate resistance materials.)

A pair of conductively coated end caps 27—27 are pressed over axially opposite ends of the core periphery in engagement with corresponding ends of the coating 26. The coated core is hermetically sealed within an optically transparent cylindrical jacket 28 (FIG. 1), illustratively of clear glass, which may contain an inert gas. Terminal access to the resistor 22 is provided by a pair of axially disposed conductors 29—29 extending outwardly from the end caps 27 and through the surrounding jacket 28.

As is well known, the resistance of deposited carbon resistors may be selectively increased by removing controlled portions of the carbon coating from the core periphery. In the practice of the present invention, such removal is accomplished without prior machining or rubbing and with the encapsulating jacket 28 in place by employing one or more optical beam pulses (hereafter sometimes called "laser shots") from the generator 23. The pulses are directed downwardly along an optical axis 30 toward predetermined coated portions of the core periphery on the underlying resistor. Each laser shot will locally heat and evaporate, from the underlying core, a region of carbon generally having the cross-sectional shape and size of the incident beam, thereby exposing a correspondingly shaped dielectric region of the core.

The encapsulated element 22 is oriented horizontally, as viewed in FIG. 1, within a central portion 31 of a mounting platform 32. The platform 32 is provided with a pair of standards 33—33 that terminate the central portion 31 at axially opposite ends.

Figure 3:
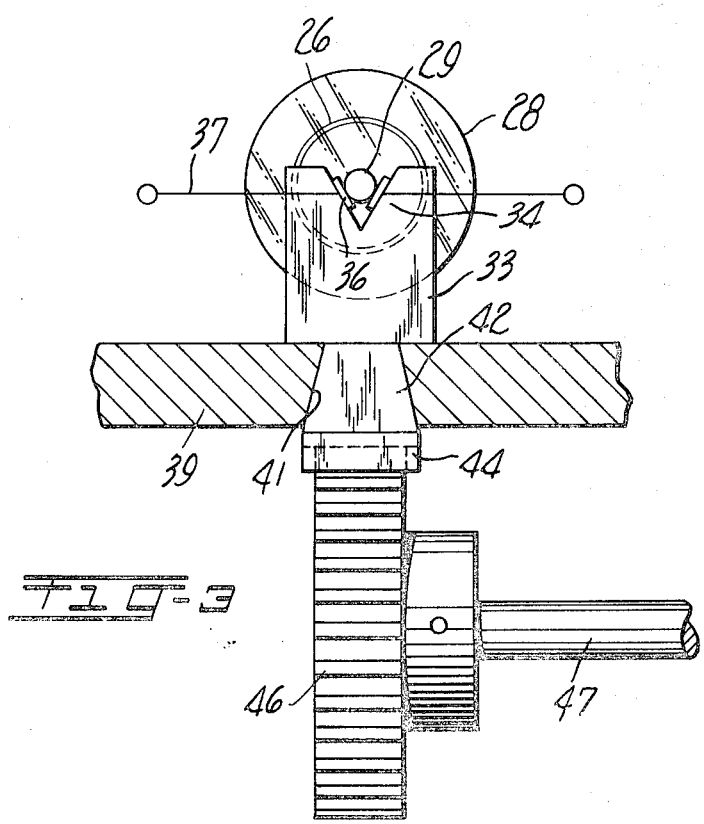
FIG. 3 is an end view of a movable platform for mounting an encapsulated resistor in the apparatus of FIG. 1.

As best shown in FIG. 3, each standard 33 includes an upper region 34 formed from an insulating material and having a generally V-shaped cross section for receiving and supporting an adjacent one of the axially extending conductors 29 of the element 22. The converging sides of the portion 34 are individually provided with a pair of mutually insulated conductive contacts 36—36 for electrically engaging opposite sides of the adjacent conductor 29. A pair of leads 37—37 respectively extend from the coatings 36 on each standard 34, and the resulting four leads 37 (FIG. 1) form a four-wire input to a resistance classifier 38.

The platform 32 is slidably mounted for axial movement within a resistor guide member 39 so that selected core portions of the resistor 22 seated therein may be brought into registration with the optical axis 30. The guide member 39 includes a centrally slotted portion 41 (FIG. 3) for receiving and guiding a downwardly extending lip 42 of the resistor mounting platform 32 (FIG. 1) between a pair of axially opposed limit stops 43—43. The lip 42 is terminated at its lower end by an axially extending rack 44 which may be engaged and driven by a vertically disposed pinion 46 mounted on a horizontal shaft 47. Preferably, the shaft 47 is coplanar with and perpendicular to the optical axis 30.

The guide member 39 is so positioned that a region of the resistor core 24 close to and spaced by a fixed distance A from the right end cap 27 (hereafter the "reference end cap") is centered on the optical axis 30 when the platform 32 is in engagement with the left limit stop 43 of the guide member 39.

The pinion 46, which may be an anti-backlash gear of any suitable type, may be selectively driven in either of two opposite rotational senses by a bi-directional stepping motor 48 that is coupled to the pinion shaft 47. The motor 48 is employed in the automatic mode discussed below. Alternatively, the pinion shaft 47 is positioned, when manual operation is desired, by a disengageable hand crank 49 that may override the motor 48 by means of a suitable spring loaded arrangement not shown. The rotation of the pinion 46 through a predetermined angular increment by either the motor 48 or the crank 49 advances the platform 32 axially by a corresponding linear increment.

Ideally, a longitudinal axis 51 of the resistor 22 should intersect the optical axis 30 at right angles.

However, with the use of the infinite focus laser optics discussed below, some tilt of the axis 51 in the plane of the drawing is permissible. Such tilt may occur, for example, when the resistor core 24 is canted slightly within its encapsulating jacket 28.

The optical beam generator 23 includes a downwardly extending, cylindrical ruby rod 52 mounted in an optical cavity 53. The rod 52 is optically excited by a pair of pulsed xenon flash lamps 54, one of which is shown schematically as a coil surrounding the rod 52. Light from the lamps 54 is concentrated in the rod 52 by means of mirrors (not shown) in the cavity 53. A partially reflecting coating 56 is disposed on the bottom of the rod 52 and a suitable reflecting arrangement (described below) is coupled to the top of the rod.

High power DC pulses necessary to energize the flash lamp 54 are provided by a conventional DC power supply and pulse forming network 57. The energy of the pulse forming network is selectively outpulsed to the lamp 54 in response to control pulses from a trigger circuit 58. The trigger circuit is selectively energized by a suitable source 59 through a switch 61, which may be set for either automatic or manual operation. In the manual mode, a single control pulse is applied to the network 57 by the trigger circuit 58 upon each depression of a push button 62, which momentarily couples the source 59 to the trigger circuit. In the automatic mode, the trigger circuit 58 is energized by the source 59 through a pulse generating network 63 upon operation of a normally open contact OP10, and will continue to apply control pulses at regular intervals (illustratively one pulse per second) to the network 57 until disabled by the release of the contact OP10.

Each application of a DC pulse from the network 57 to the lamp 54 causes the ruby rod 52 to emit, through its front coating 56 and along the optical axis 30, a high intensity burst of light energy in the form of a highly directional monochromatic beam having a substantially circular cross section and a wavelength determined by the media of the rod. For example, a ruby rod 52 with a diameter of ⅜ inch and a length of 6⅝ inches will yield an optical beam whose wavelength is 6943 A.

The pulse length of each laser shot from the generator 23 is made extremely short (in the order of tens of nanoseconds) so that the resulting vaporization of carbon from the underlying resistor core 24 may be terminated before significant redeposition of the evaporated carbon occurs on the overlying glass encapsulating jacket 28.

To provide the required short duration optical pulses, the generator 23 is operated in the so-called "Q"-switched mode. In this mode, the reflecting arrangement associated with the top of the rod 52 includes an external mirror 64 spaced from and coupled to the top of the rod through a conventional Pockels cell 66. The latter cell is optically transparent except when excited by a high voltage short duration DC pulse from the network 57, at which time the optical polarization of the cell is rotated to effectively provide a high degree of optical loss in the cavity 53. For this purpose the trigger circuit 58 supplies a further control pulse to the network 57 to cause the latter to excite the cell 66 a predetermined time after the occurrence of the leading edge of each DC pulse applied to the lamp 54. Details of such "Q"-switched arrangements are well known to those in the art and will not be discussed further here.

Under the "Q"-switched conditions assumed, each laser shot from the generator 23 will have a peak power of ten megawatts and a pulse duration of 50 nanoseconds. This corresponds to a shot having a peak power of two hundred watts and a pulse duration of 2.5 milliseconds when the so-called burst-mode operation of the rod 52 is employed (i.e., operation without the cell 66 and with the mirror 64 or an equivalent coating disposed on the top surface of the cavity 53).

In accordance with the invention each circular beam pulse from the generator 23 is directed through an optical beam shaper 67 before it reaches the resistor core 24. The shaper 67 provides a masking action that alters the cross section of the beam into a slot-like configuration whose length is defined by an adjustable first dimension (designated M) smaller than the diameter of the circular beam and oriented mutually perpendicular to the optical axis 30 and the resistor axis 51. The width of the slot-like configuration is defined by a second dimension (designated N) that is perpendicular to the dimension M and generally parallel to the resistor axis 51. For purposes of the following discussion, the dimension N may be assumed to be fixed.

The beam shaper 67 includes a generally opaque mask 68 (FIG. 4) that is centered, by means of a suitable support 69, on the optical axis 30 in the path of the beam. The mask 68 is provided with an elongated central slot 70 having an axis 70A (FIG. 5). The longer dimension of the slot is oriented to be mutually perpendicular to the optical axis 30 (FIG. 4) and to the resistor axis 51 (FIG. 5). The length of the slot 70 is chosen to be less than the diameter (designated C) of the incident beam but greater than the maximum value of the first dimension M of the shaped optical beam. The width of the slot 70 is chosen to be equal to the other dimension N of the shaped beam.

The shaper 67 further includes a conventional adjustable iris 71 (FIG. 4) disposed directly below and parallel to the mask 68. The iris 71 has a central circular opening 72, of adjustable diameter, positioned by the support 69 on the optical axis 30 in alignment with the slot 70. The periphery of the circular opening 72 is defined by a plurality of adjustable, optically opaque and overlapping spiral sections 73—73 (FIG. 5). The portion of the iris opening 72 extending parallel to a pair of longer sides 74—74 of the slot 70 and exposed to the incident beam through the latter slot establishes the adjustable dimension M of the slotted beam cross section.

Because of the presence of the slot 70 (FIG. 4) and the corresponding underlying iris opening 72, a slot-shaped segment of the incident circular beam approximately M x N in area is transmitted through the shaper 67.

The size of the iris opening 72, and thus the dimension M of the shaped beam perpendicular to the resistor axis 51, may be varied by means of a conventional iris control rod 76 connected to the overlapping spiral sections 73 of the iris 71. The rod 76 extends transversely through an elongated carriage 77. The carriage is mounted for movement in the plane of the iris by means of an underlying guide member 78 (FIG. 6) which may be similar to the resistor guide member 39 of FIG. 1. The carriage 77 has a downwardly extending lip 79 that projects through a complementary slot 81 (FIG. 5) disposed in a central portion 82 of the guide member 78. The slot 81 is terminated on axially opposite ends by a pair of limit stops 83—83. The lip 79 (FIG. 6) terminates in a second rack 84 that may be engaged by an underlying pinion 85 carried by a shaft 86.

As shown schematically in FIG. 1, the shaft 86 may be selectively moved in either one of two opposite rotational senses by a second bi-directional stepping motor 87 similar to the motor 48 discussed above. Alternatively, the shaft 86 may be positioned by means of a second disengageable hand crank 88 which may override the motor 87 by means of a spring loaded arrangement not shown. When the pinion shaft 86 is rotated, the resulting translational movement of the carriage 77 (FIG. 6) in the plane of the iris 71 pivots the iris control rod 76 (FIG. 5) and varies the iris opening 72. Illustratively, the latter opening may be varied from a maximum .281 inch when the carriage 77 engages the lower limit stop 83 of the guide member 78, as shown, to a minimum of zero when the carriage 77 engages the upper limit stop 83.

In many cases the area of the slot-shaped beam at the output of the shaper 67 (FIG. 1) is much larger than the size of the area of carbon to be removed from the underlying core 24 of the resistor 22. Assuming that this is the case, the shaped beam is directed through a beam sizer 89 interposed between the beam shaper 67 and the resistor 22 under test.

The beam sizer 89, which is illustratively a lens arrangement of the type described in copending application Ser. No. 664,747, filed Aug. 31, 1967, is depicted in FIG. 7. The sizer 89 includes an upper lens 91 having a relatively long focal length $F_1$ and a lower lens 92 having a relatively short focal length $F_2$. The lenses 91 and 92 are longitudinally spaced along the optical axis 30 and are optically aligned with their respective focal planes coincident at an intermediate plane 93. The upper lens 92 acts as a focusing lens for the beam incident thereon from the shaper 67. The lower lens 92 acts as a recollimating lens for the beam focused by the upper lens, thereby providing an "infinite focus" for the reduced size beam transmitted therethrough.

The ratio of the first dimension M of the shaped beam at the input of the upper lens 91 to a corresponding reduced dimension S of the beam at the output of the lower lens 92 is directly proportional to the ratio of the focal lengths of the upper and lower lenses. (It will be assumed that the dimension S is less than the diameter of the core 24 (FIG. 1) of the resistor 22.) While not explicitly shown in FIG. 7, the same is true with regard to the ratio of the second dimension N of the shaped beam at the input of the upper lens 92 (FIG. 7) to a corresponding reduced dimension (designated T) at the output of the lower lens. As an example, the focal lengths of the lenses 91 and 92 may be adjusted such that an incident shaped beam having dimensions M=.281 and N.=093 is reduced seven times in size to a similarly shaped beam having dimensions S x .040 and T x .013. The resulting sized and shaped beam at the output of the sizer 89, when directed against the core periphery of the element 22 (FIG. 1), will vaporize therefrom a strip of carbon approximately S x T in area.

In order to visually monitor the optical vaporizing of the core periphery without damage to the eyes, the arrangement shown in FIG. 8 may be employed. A dichroic mirror 94 is interposed in the path of the shaped and sized beam and centered on the optical axis 30. The mirror 94 is designed to be transparent to the wavelength of the highly monochromatic laser beam propagating along the optical axis 30, and therefore does not interfere with the laser shot. However, the mirror is opaque to substantially all other wavelengths, so that light from an ordinary bulb (not shown) disposed below the resistor 22 (FIG. 1) provides an upwardly directed image of the resistor that is reflected by the mirror 94 (FIG. 8) to a suitable television camera 96. A lens 97 is advantageously employed between the mirror 94 and the camera 96 to focus the reflected image on the image plane of the camera 96. The latter relays the image in a conventional manner to a television receiver 98 to allow remote viewing of the resistor during the laser shots with complete operator safety.

It will be apparent that by employing a fixed, suitably positioned reticle (not shown) on the optical axis 30 in the path of the reflected image, a fixed reference line may be provided on the screen of the receiver 98 as an aid in initially aligning the resistor 22 with the optical axis 30, if desired.

As shown schematically in FIG. 9, the classifier 38 (which may be the type supplied under the designation "Type 124C Sorting Bridge" by the Boonton Company) includes a conventional bridge circuit 99 that measures the instantaneous resistance of the element under test by suitably operating on the four input leads 37 from the resistor mounting platform 32. A conventional sorting circuit 101, responsive to the element resistance represented by the output of the bridge 99, is arranged to close an energizing path to ground for a selected one of a plurality of range relay coils LR, 1R, 2R . . . iR . . . 7R, AR, and HR.

The energizing path includes a suitable DC source 102, switch 103, the sorting circuit 101 and one of the range coils. The switch 103 may be set for either manual or automatic operation.

The resistance ranges individually assigned to the several range relay coils represent prescribed amounts of deviation of the measured resistance of the element 22 from the desired nominal value to be reached at the end of the trimming operation. These ranges may be respectively designated LOW, 1, 2 . . . i . . . 7, ACCEPT, and HIGH. The sorting circuit 101 may be typically programmed as in Table 1 below to energize one of the range relay coils when the bridge 99 measures an instantaneous element resistance in an associated range.

TABLE 1

| Instantaneous measured deviation of resistance from nominal | Corresponding resistance range | Range coil energized |
| --- | --- | --- |
| More than 15% below | LOW (reject) | LR |
| 10.8–15% below | 1 | 1R |
| 7.9–10.8% below | 2 | 2R |
| 5.7–7.9% below | 3 | 3R |
| 4.6–5.7% below | 4 | 4R |
| 3.5–4.6% below | 5 | 5R |
| 2.7–3.5% below | 6 | 6R |
| 1.0–2.7% below | 7 | 7R |
| 1% below–1% above | ACCEPT | AR |
| More than 1% above | HIGH (Reject) | HR |

The illustrative range program of Table 1 may be employed for trimming, to within ±1% of a desired nominal value, coated film resistors that are initially undervalued by 1–15% below the desired value. If the desired value is 75 ohms, for example, resistors initially falling between 63.7–74.2 ohms (i.e., in ranges 1–7) are considered trimmable in accordance with the invention. Resistors initially less than 63.7 ohms fall in the LOW range and are considered rejectable. Resistors between 74.3 and 75.7 ohms already fall in the ACCEPT range and need no trimming. Resistors greater than 75.7 ohms fall in the HIGH range and are considered rejectable.

Each range relay coil LR, 1R, 2R . . . iR . . . 7R, AR, and HR is provided with one or more normally open and/or normally closed sets of contacts which have been given corresponding reference designations. In particular, a plurality of normally open contacts LR10, 1R10, 2R10 . . . iR10 . . . 7R10, AR10, and HR10 individually interconnect a plurality of indicator lamps LM, 1M, 2M . . . iM . . . 7M, AM, and HM in suitable energizing paths to ground.

With this arrangement, the energizing of a particular range coil iR causes a visual indication on the corresponding lamp iM via a closure of the associated contact iR10 so that an operator can visually monitor the instantaneous resistance range of the element under test.

Operation-general considerations

The employment of the apparatus of FIGS. 1–9 to trim resistors in accordance with the invention depends on the satisfaction of several criteria.

Firstly, it will be recognized that damage to the glass encapsulation during the trimming operation (i.e., due to heating of carbon redeposited on the glass jacket after each laser shot) must be avoided. As indicated above, the use of extremely short duration laser pulses by Q-switching the rod 52 (FIG. 1) helps in this regard. Further insurance against glass damage is provided, in accordance with the invention, by axially spacing the successive regions of the resistor core 24 to be stripped of carbon by successive laser shots. The axial spacing should be greater than the width T of the reduced size, slot-shaped beam directed against the resistor under test.

Secondly, it is desired that resistors differing widely in initial resistance range be brought into value with as few laser shots as possible. This requires that, at least for resistors initially falling in the lower ranges, a relatively large resistance change must be effected for a given area of carbon removed by each laser shot. It has been found that this criterion is best satisfied by orienting the dimension M of the beam perpendicular to the resistor axis, as indicated before, so that the film is evaporated in strips that extend across the path of current flow in the resistor.

Finally, in order to provide optimum trimming for each range of resistance without the necessity of prior machining, advantage is taken of the adjustability of the dimension M of the shaped beam and thus of the length of the film strip removed from the resistor core. The resistance increment obtained by each laser shot generally increases with increasing length of the strip, i.e., with increasing values of the dimension M. Where a plurality of strips are to be removed, the initial strip provides the largest resistance increment while subsequent coexistensive strips provide resistance increments that decrease monotonically as the number of strips increases, so that ideally the resistance of the element converges toward the desired nominal value. As explained below the rate of convergence may be further controlled in accordance with the invention by selectively resetting the dimension M to a smaller value after a given number of laser shots has occurred in the trimming operation.

In order to assure optimum trimming in accordance with these criteria a plurality of preselected, successively smaller iris openings are initially employed at the start of the trimming operation for use in trimming resistors falling in the successvely hgher trim ranges 1–7. In the following, it will be assumed that the relation between the adjustable shaped beam dimension M and the instantaneous resistance of the element 22 is chosen in accordance with Table 2. [It will be further assumed that (a) the dimension M, i.e., the maximum iris diameter, is .281 as before; (b) the dimension N is .093 inch; and (c) a maximum of six laser shots are permitted for the trimming operation.]

TABLE 2

| Initial resistance range | Initial setting of dimension M (percent of maximum value) | Setting of dimension M after 3rd shot if range 6 or 7 is reached (percent of maximum value) |
|---|---|---|
| LOW | | |
| 1 | 90 | 70 |
| 2 | 80 | 60 |
| 3 | 60 | 60 |
| 4 | 50 | 50 |
| 5 | 40 | 40 |
| 6 | 33 | 33 |
| 7 | 25 | 25 |
| ACCEPT | | |
| HIGH | | |

Table 2 indicates that for resistors initially falling in one of the ranges 3–7, the dimension M (and thus the iris openign) assigned to the measured range is held invariant for each laser shot necessary to effect the trim. In the case of resistors initially falling in ranges 1–2 and therefore having a larger initial deviation from the nominal, the prescribed initial iris opening may in some cases be held constant only for the first three shots. Thus, if at the end of the third shot such a resistor has increased sufficiently in value to reach range 6 or range 7, the iris opening is reduced to a prescribed smaller value for the remainder of the shots to avoid over-trimming, i.e., to prevent the resistance increase during trim from bypassing the ACCEPT range and reaching the HIGH range. Ordinarily, such interim adjustment of iris size is required only when the resistor initially falls in an "upper" portion of range 1 (generally 12–15% below nominal) or in an "upper" portion of range 2 (7.9–10% below nominal).

Table 3 shows a typical progression of resistance increments of an element being trimmed when the program shown in Table 2 is employed.

TABLE 3

| Initial resistance range | Range typically reached after laser shot number | | | | | |
|---|---|---|---|---|---|---|
| | 1 | 2 | 3 | 4 | 5 | 6 |
| 1 (lower part) | 2 | 3 | 4 | 6 | 7 | ACCEPT |
| 1 (upper part) | 3 | 5 | 6¹ | 7 | ACCEPT | |
| 2 (lower part) | 3 | 4 | 5 | 6 | 7 | Do. |
| 2 (upper part) | 4 | 5 | 7¹ | 7 | ACCEPT | |
| 3 | 4 | 6 | 7 | 7 | do | |
| 4 | 5 | 6 | 7 | ACCEPT | | |
| 5 | 6 | 7 | 7 | do | | |
| 6 | 7 | 7 | ACCEPT | | | |
| 7 | 7 | ACCEPT | | | | |

¹ Signifies iris opening reduction for 4th and any subsequent shots.

Detailed operation-manual mode

In order to employ the apparatus of FIGS. 1–9 and the program of Tables 1–2 in the manual mode for trimming an undervalued resistor 22, the switch 61 (FIG. 1) in the generator 23 and the switch 103 (FIG. 9) in the classifier 38 are set in their manual positions. The bidirectional stepping motors 48 and 87 (FIG. 1) are deactivated, and the resistor mounting platform 32 and the shaper 67 are made positionable by their associated hand cranks 49 and 88, respectively.

Before the start of the trimming operation, the iris hand crank 88 is positioned so that the carriage 77 (FIG. 5) is in the position shown, i.e., against the lower limit stop 83 of the guide member 78. In this position, the iris opening is set at its maximum or reset value. The resistor hand crank 49 (FIG. 1) is positioned as shown with the platform 32 engaging the left limit stop 43 in the guide member 39. In this position, the region of the resistor core 24 spaced by the distance A from the reference end cap 27 is in registration with the optical axis 30. (The distance A should be greater than half the width T of the sized and shaped beam so that the latter does not overlap the reference end cap.) Assuming, for illustration, that the initial resistance of the element 22 is 66 ohms the bridge 99 (FIG. 9) conditions the sorting circuit 101 to complete an energizing path to ground through the source 102, the switch 103, the sorting circuit 101, and the relay coil 1R associated with the range (i.e., range 1) in which the 66 ohm resistor under test falls. The energizing of the coil 1R completes an energizing path to ground for the range 1 indicator lamp 1M by operating the associated contact 1R10. The energized lamp 1M visually informs the operator that the pretrimmed resistance of the element under test has fallen in range 1.

In accordance with Table 1, the operator then rotates the iris hand crank 88 (FIG. 1) to set the diameter of the iris opening at .261 inch i.e., 90% of the maximum opening of .281 inch. As a result, the dimension M of the shaped beam will likewise be .261 inch.

The push button 62 in the generator 23 is now momentarily depressed to energize the trigger circuit 58 once from the source 59 through the trigger switch 61. Accordingly, a trigger pulse is applied to the nework 57 and a single high intensity, circular optical beam from the ruby rod 52 propagates down the optical axis 30.

The circular beam is altered by the beam shaper 67 into a slot-like configuration having an M x N (i.e., .261 x .093 inch) cross section. The shaped beam is reduced seven to one by the sizer 89 to an S x T cross section approximately .037 x .013 in area. The sized and shaped beam passes through the underlying glass jacket 28 of the resistor 22 and vaporizes a strip of carbon approximately S x T in cross section from the underlying portion of the core 24. As a result, a corresponding strip 106 (FIG. 10) on the underlying core 24 is exposed. As noted before, the dimension S is perpendicular to the resistor axis 51 and the dimension T is generally parallel to the resistor axis. (Strictly speaking, because of the curvature of the resistor core 24, the dimension S of the strip 106 is not truly rectilinear but may extend in an arc partially around the periphery of the core. For planar types of film resistors, which are trimmable in a manner analogous to that described here, the dimension S would define a straight line.)

As indicated in Table 3, the first laser shot is normally sufficient to remove enough carbon from the core periphery to bring the resistance value of the element 22 from the upper portion of range 1 to range 3. As a result, the bridge 99 (FIG. 9) reconditions the sorting circuit 101 after the first shot to deenergize the coil 1R and to energize the range 3 coil 3R. This, in turn will deenergize the indicator lamp 1M by releasing the contact 1R10 and will energize the indicator lamp 3M by operating the associated contact 3R10.

Since the ACCEPT condition has not been reached at the end of the first laser shot, at least a second shot must be employed. Also, since no change in iris opening is called for by Table 2 at this time, the second laser shot will be coextensive with the first shot.

Prior to the second shot, the resistor hand crank 49 (FIG. 1) is adjusted to axially advance the platform 32 by a distance D (FIG. 11) in a direction away from the reference end cap 27 of the resistor. The spacing D is made significantly greater than the width T of the strip 106 to avoid overlapping of successive laser shots.

The push button 62 (FIG. 1) is momentarily depressed again and a second laser shot thereupon impinges on the core periphery to expose a second carbon-free strip 107 (FIG. 11) that is parallel to and coextensive with the strip 106. Table 3 specifies that the removal of the second strip will normally increase the resistance of the element under test from range 3 to range 5. In response to this, the indicator lamp 3M (FIG. 9) is energized and the indicator lamp 5M deenergized in a manner analogous to that described above. Since the ACCEPT condition has still not been reached, a third laser shot must be taken. According to Table 2, no change in iris opening is called for and the beam dimension M will remain at .261 inch.

The crank 49 (FIG. 1) is again rotated to axially advance the platform 32 by the distance D. The push button 62 is then depressed again so that the third laser shot is applied to the resistor core 24 to expose a third strip 108 (FIG. 11) of the underlying dielectric core in a pattern coextensive with the strips 106 and 107.

The carbon removed by the third shot is ordinarily sufficient to bring the resistor into range 6. Thus, at least one more shot will be required to reach the ACCEPT range. This time, however, Table 2 requires that the iris opening be decreased prior to the fourth shot to assure that the resistance increments resulting from subsequent shots will not be so gross as to overshoot the high end of the ACCEPT range (i.e., 75 ohms±1%). Therefore, the iris hand crank 88 (FIG. 1) is adjusted to decrease the iris opening from 90% of the iris reset value to 70%. This reduced opening (about .197 inch) is not changed again for the remainder of the trimming operation.

The resistor hand crank 49 is also rotated at this time to again axially advance the platform 32 by the distance D.

When the fourth laser shot is applied to the resistor core, a strip 109 (FIG. 11) whose dimension S is approximately .028 inch is exposed on the core 24. According to Table 3, the resistance increment caused by this fourth laser shot is generally enough to bring the resistor 22 into range 7. Thus, a fifth laser shot having the same beam cross section as the fourth shot is applied to the core to expose a fifth strip 111 coextensive with the strip 109.

It will be noted from Table 3 that this fifth shot is usually sufficient to raise the resistance of the tested element to the ACCEPT range. Occasionally, as when the carbon coating on the resistor core is not uniform, the resistance of the element after the fifth shot is still low. In this case, a sixth shot (with the same reduced iris opening) will be necessary to vaporize additional carbon from the core and expose a sixth strip 112 (FIG. 11) spaced from the fifth region by the distance D.

In any event, once the ACCEPT range is reached (as determined by the energizing of the indicator lamp AM in the classifier 38 of (FIG. 9) the trimming operation is terminated and the trimmed resistor may be removed from the platform 32.

It is noted from Table 2 that the reduction of iris diameter from 90% to 70% of the maximum value after the third shot is required only if range 6 or range 7 is reached at that time. In the event that the third laser shot is insufficient to bring the resistor into range 6 or 7, the iris diameter is kept at its original setting of .261 inch for the entire trimming operation.

As a result of the trimming operation just described, the coated core periphery of the trimmed resistor is apertured to include at least one exposed dielectric strip (as in FIG. 10) and generally a plurality of exposed strips (as in FIG. 11). The trimmed core configuration shown in FIG. 11 is representative of the case where the resistor under test initially falls in range 1 or 2 and subsequently reaches range 6 or 7 after the third shot. As shown, the dimension S of the strips relatively remote from the reference end cap 27 is smaller than the corresponding dimension of the strips closer to the reference end cap.

The core configuration of FIG. 12, shown for purposes of comparison, is representative of those trimmed resistors that initially fall within range 3–7 or, alternatively of those trimmed resistors initially falling in range 1 or range 2 which do not reach range 6 or 7 after the third laser shot. In each such case, the iris dimension is kept constant at the initial opening assigned to that range in accordance with Table 2, and the apertured carbon coating on the core surrounds and defines from one to six underlying, axially spaced dielectric strips (six being shown) having identical dimensions S perpendicular to the resistor axis.

Automatic mode-general considerations

As an alternative to the manual mode operation just described, the resistor trimming operation may also be instrumented in accordance with the invention as an essentially automatic basis. In this automatic mode, the operator need only insert the untrimmed resistor in the platform 32 (FIG. 1), depress a suitable push button once to initiate the trim, and remove the trimmed resistor from the platform.

As indicated above, the first bi-directional stepping motor 48 (which may be in incremental motor of conventional design such as that manufactured by the Ledex Corporation) is used to position the platform 32 in the automatic mode. The motor 48 may be rotated through a predetermined angular increment $\Delta\theta$ in a selected one of the two opposite rotational directions each time a control pulse is applied to a corresponding one of two internal control solenoids (not shown). For purposes of simplicity, the motor 48 may be represented in block form by two selectively excited uni-directional motors 113 and 114 coupled to the pinion shaft 47. During the trimming operation, the motor 113 (designated resistor position indexer) is employed to incrementally rotate the pinion 46 clockwise as viewed in FIG. 1 by an amount sufficient to axially index the resistor mounting platform 32 through the increment D (FIG. 11) in the direction to the right as viewed in FIG. 1 each time a control pulse is applied to an input port 116 of the indexer 113.

At the conclusion of the trimming operation the motor 114 (designated resistor reset indexer) is employed to incrementally rotate the pinion 46 counterclockwise to axially index the platform 32 to the left by the same increment D each time a control pulse is applied to an input port 117 of the indexer 114. In this way, the platform 32 may be brought back to its initial position against the left limit stop 43 of the guide member 39. The required relationship between the angular increment $\Delta\theta$ traversed by the indexers 113 and 114 and the required linear increment D of the mounting platform 32 may be obtained with a suitable motion translating device such as a gear train (not shown) or the like.

The second bidirectional motor 87 is used to position the iris 71 (FIG. 6) during the automatic mode by driving the pinion 85 coupled to the iris control rod carriage 77. The motor 87 is represented in block form in FIG. 1 by a second pair of selectively excited uni-directional motors 118 and 119 coupled to the pinion shaft 86. The motor 118 (designated iris position indexer) is employed to index the carriage 77 (FIG. 5) in an upward direction as viewed in the figure by an amount $\Delta W$ each time a pulse is applied to an input port 121 (FIG. 1) of the indexer 118. Each upward increment $\Delta W$ rotates the iris control rod 76 (FIG. 5) counterclockwise (as viewed in the figure) to reduce the diameter of the iris opening 72 by a discrete increment. The indexer 118 (FIG. 1) is employed to set the appropriate initial iris opening for the resistor under test and to change the iris opening during the trimming operation where required by Table 3.

The motor 119 (designated iris reset indexer) is employed after the conclusion of the trimming operation to reset the iris opening to its maximum value by indexing the carriage 77 (FIG. 5) downwardly by the amount $\Delta W$ each time a pulse is applied to an input port 122 (FIG. 1) of the indexer 119. Each such downward increment $\Delta W$ discretely increases the iris opening toward its maximum or reset value.

Control pulses for the resistor indexers 113 and 114 are selectively supplied over a pair of output paths 123 and 124 of a resistor positioner 126. The latter is rendered effective by output pulses from the laser trigger circuit 58 over a path 127 in which a delay network 128 is interposed.

Control pulses for the iris indexers 118 and 119 are selectively supplied over a pair of output paths 129 and 131 of an iris positioner 132. The positioner 132 is regulated by signals applied thereto from a programmed controller 133 over a path 134. The controller 133, in turn, develops the appropriate signals for the iris positioner 132 in accordance with the instantaneous measured range of the resistor 22 as determined by the resistance classifier 38 (FIG. 9), whose switch 103 is now set in the automatic position. Changes in the iris opening during the trimming operation is triggered by suitable signals supplied to the controller 133 (FIG. 1) by the resistor positioner 126 over selected pairs of a plurality of paths 136a, 136b, and 136c.

The controller 133 also initiates laser action in the automatic mode by operating the normally open contact OP10 in the trigger energizing path when the switch 61 is set in the automatic position. The controller also terminates the trimming operation by reopening the contact OP10.

Details of the resistor positioner 126, the iris positioner 132, and the controller 133 are described in more detail below.

It will be recalled from the description of the manual mode and the associated Tables 1 and 2 that (a) seven trimming ranges were employed; (b) a maximum of six laser shots were permitted; and (c) the iris position, once set at the start of the trimming operation, was changed during the operation only when resistors initially in range 1 and 2 reached range 6 or 7 after the third shot. However, for pusposes of simplicity and brevity in the description of the automatic mode, it will be assumed that (a) four trimming ranges only are employed; (b) a maximum of four laser shots are permitted; and (c) the iris opening is changed during the trimming operation only if a resistor initially in range 1 or range 2 reaches range 3 or 4 after the third shot. Accordingly, it will be assumed that the classifier 38 (FIG. 9) operates only with the range relay coils LR, 1R, 2R, 3R, 4R, AR, and HR. The construction and operation of a full seven range, six shot system programmed in accordance with Tables 1 and 2 for use in the automatic mode will be readily apparent from the following description of the abridged four range, four shot system.

As shown in FIG. 13, the illustrative resistor positioner 126 includes four stepping switches 137a–d respectively including a plurality of movable contact arms 138a–d and a plurality of insulated fixed contact blocks 139a–d.

In practice, each stepping switch 137 may be a separate rotary switching deck associated with the bidirectional motor 48 (FIG. 1) and driven by the output shaft of the motor.

Each contact arm 138 (FIG. 13) is in electrical engagement with one of a plurality of fixed contacts 141—141 extending from the associated block 139. The number of fixed contacts 141 on each of the blocks 139 coincides with the maximum number of laser shots (i.e., four) permissible in the automatic mode, and thus, with the maximum number of separate discrete positions of the resistor platform 32 (FIG. 1) that may be brought into registration with the optical axis 30 during the trimming operation. The switches 137 (FIG. 13) are mechanically ganged and mutually coupled via a link 141' to the indexers 113 and 114 (FIG. 1) in such a manner that each indexing movement of the platform 32 in either direction advances the ganged contact arms 138 (FIG.

13) in the same direction to next successive contact 141 in the associated block 139.

Briefly stated, the stepping switches 137a and 137b are individually employed in the generation of control pulses for the resistor reset indexer 114 and the resistor position indexer 113, respectively. The stepping switch 137c is employed after the occurrence of the fourth and last laser shot in the event that the resistor under test has not reached the ACCEPT range. The stepping switch 137d is employed to couple the paths 136a and 136b to the controller 133 before the first laser shot and to couple the paths 136a and 136c after the third laser shot.

Before the start of each trimming operation, the stepping switches 137 are in their leftmost position as shown in FIG. 13, corresponding to the initial position of the resistor platform 32 (FIG. 1) against the left limit stop 43 of the guide member 39.

Since the switch 137b is closed in its leftmost position, normally disabled charging path to ground is conditioned for a capacitor 142 through a source 143, the switch 137b, one input of a normally closed AND gate 144, a coil KA, and a normally closed contact KB1C. The other input of the AND gate 144 is coupled to the trigger lead 127 so that after an interval determined by the delay circuit 128 (FIG. 1), each trigger pulse from the circuit 58 may momentarily open the AND gate 144 (FIG. 13) and enable the charging path for the capacitor 142.

The last-mentioned delay assures that each laser shot is completed before the underlying portion of the core is advanced away from the optical axis 30 by the resistor positioner 126 in the manner described below. In many cases, the separate delay circuit 128 (FIG. 1) may be dispensed with, and the required delay between the trigger pulse and the movement of the platform 22 is provided by the mechanical inertia of the platform 32 and its associated components.

When the AND gate 144 (FIG. 13) is opened, the initial charging current for the capacitor 142 energizes the coil KA and opens a normally closed contact KA1C to isolate a coil KB from the charging path. The charging current diminishes exponentially with time, however, until it is insufficient to maintain the energized condition for the coil KA. The resulting disabling of the coil KA releases the contact KA1C and completes a discharge path to ground for the now-charged capacitor 142 through the coil KB.

A second charging path to ground is normally established for a second capacitor 146 through a source 147, a resistor 148, and a normally closed contact KB2C. When the coil KB is energized as noted above, the contact KB2C is operated to open the second charging path and to operate a normally open contact KB1O. If the ACCEPT or HIGH resistance range is not reached at the end of the first laser shot, the capacitor 146 will discharge through the operated contact KB1O and a set of serially connected contacts AR2C, HR2C, and P1C to effectively provide a stepping pulse to the path 123. The resistor position indexer 113 (FIG. 1) responds to this stepping pulse by axially advancing the resistor mounting platform 32 through the distance D to the right in preparation for the next laser shot.

The length of the stepping pulse is determined by the interval that the coil KB (FIG. 13) remains energized by the discharge current of the capacitor 142. When the exponential decay of this discharge current has proceeded long enough to disable the coil KB, the contacts KB2C and KB1O are released. This disables the discharge path for the capacitor 146 to terminate the stepping pulse and simultaneously reestablish the charging path for the capacitor 146.

In the event that the ACCEPT or HIGH range is reached at the end of the first laser shot, the trimming operation is terminated and the range coil AR (FIG. 9) or the range coil HR, respectively, will be energized. As a result, the associated one of the contacts AR2C and HR2C (FIG. 13) in the path 123 will be operated and will prevent a stepping pulse from being applied to the resistor position indexer 113. Thus, the mounting platform 32 (FIG. 1) will not be advanced to the right from its initial positions shown.

Assuming that the trimming operation is not terminated by the first shot, the indexing of the resistor platform 32 by the increment D to the right simultaneously moves the contact arms 138 of the ganged switches 137 one position to the right into engagement with the second contacts 141 on the associated blocks 139. In this position, the switch 137b remains closed and reconditions the charging path for the capacitor 142 from the source 143 to ground through the AND gate 144, the coil KA, and the contact KB1C. Also, an energizing path is established from the source 143 to ground for a coil Q via the switch 137a.

After the occurrence of the second laser shot, the AND gate 144 will be opened and the charging path for the capacitor 142 will be enabled. If the second laser shot increases the resistance range of the element under test to the ACCEPT or HIGH condition, one of the contacts AR2C and HR2C will be operated to disable the path 123. If the ACCEPT or HIGH range has not been reached, however, a second stepping pulse will be applied to the indexer 113 and will (a) advance the platform 32 to the right by a second increment D in preparation for third laser shot and (b) index the contact arms 138 of the ganged switches 137 into engagement with the third fixed contacts 141 on the associated blocks 139.

Since the switch 137a remains closed in this position, the coil Q remains energized. Additionally, in this third position, the switch 137b also remains closed. Thus, the occurrence of the third laser shot will cause a third stepping pulse to be applied to the path 123 if the ACCEPT or HIGH resistance range has not been reached. The indexer 113 thereby advances the mounting platform 32 by another increment D and indexes the ganged contact arms 138 to their last or rightmost position in preparation for the fourth laser shot. The coil Q remains energized through the still-closed switch 137a.

With the resistor mounting platform 32 and the switches 137 in the rightmost position, the fourth laser shot may now be taken. If the ACCEPT or HIGH range is reached as a result of the fourth laser shot, the path 123 will be disabled as before and no further advance of the platform 32 (FIG. 1) will take place. Even if the ACCEPT or HIGH condition is not reached, however, it is noted that the switch 137c (which was open during the first three laser shots) is closed in its rightmost position. As a result, the switch 137c conditions an energizing path from the source 143 to ground for a coil P through a normally disabled AND gate 149 and a contact Q1O, which is operated by the energizing of the coil Q when the switch 137a is in its second, third, and fourth positions.

The occurrence of the fourth laser shot under these conditions enables the AND gate 149 in the same manner as the AND gate 144, and energizes the coil P. This operates the contact P1C in the path 123 to prevent the application of further stepping pulses to the resistor position indexer 113 (FIG. 1). Thus, no further advance of the platform 32 to the right will occur after the fourth laser shot irrespective of the resistance range then reached by the resistor under test.

Upon the conclusion of the trimming operation, i.e., upon the energizing of one of the range coils AR and HR (FIG. 9) in the classifier 38 or the energizing of the coil P (FIG. 13) in the resistor positioner 126, the programmer 133 (FIG. 1) terminates laser action by releasing the trigger contact OP1O in the generator 23. At the same time, the contact OP2O (FIG. 13) in the enabling input of the AND gate 144 will be released.

It will be recalled that the function of the resistor reset indexer 114 is to restore the platform 32 to its initial position shown in FIG. 1 at the conclusion of the trimming operation. The path 124 (FIG. 13), through which stepping pulses may be applied to this latter indexer, is enabled upon the energizing of one of the coils AR and HR (FIG. 9) and P (FIG. 13). The energizing of one of these coils operates an associated one of three parallel contacts AR20, HR20, and P10 in the path 124 to complete a discharge path from the capacitor 146 to the indexer 114 (FIG. 1) each time the contact KB10 (FIG. 13) is operated, i.e., each time a charging path for the capacitor 142, is completed. Since the charging path for this capacitor through the switch 137b is disabled after the trimming operation, the reestablishment of this charging path is effected through the switch 137a.

In the event that the trimming operation is terminated after the first laser shot, the switches 137 remain in their leftmost position shown in FIG. 13. The termination of the trimming operation at this time energizes the coil AR or HR (FIG. 9) in the classifier 38, which operates an associated one of a pair of parallel contacts AR30 and HR30 (FIG. 13) in series with the switch 137a and, additionally, an associated one of a pair of contacts AR20 and HR20 in the path 124. However, since the switch 137a is open when in the leftmost position, the source 143 is isolated from the capacitor 142. Thus, no stepping pulse is applied to the resistor reset indexer 114 (FIG. 1) and the resistor platform 32 will remain in its initial position.

If the trimming operation instead terminates at the end of the second laser shot, the switch 137a (FIG. 13), which is closed through its second fixed contact 141, completes a charging path from the source 143 to ground for the capacitor 142 through the now-operated one of the contacts AR30 and HR30, the coil KA, and the unoperated contact KB1C. A stepping pulse is, therefore, applied to the path 124 through the operated one of the contacts AR20 and HR20. The resistor mount 32 (FIG. 1), which had previously been stepped once to the right by the indexer 113 during the trimming operation is now stepped back into its initial position shown in FIG. 1. Simultaneously, the contact arm 138a (FIG. 13) is advanced to the left to its initial position shown in FIG. 13. In this position, the switch 137a is open and the charging path for the capacitor 142 is disabled. Hence, no more stepping pulses are applied to the indexer 114 (FIG. 1), and the resistor platform 32 remains in its leftmost position.

If the trimming operation terminates at the end of the third laser shot, the switch 137a and the resistor platform 32 have each been displaced two positions to the right from their initial locations, respectively depicted in FIGS. 1 and 13. Since the switch 137a is closed through its third contact 141, a charging path for the capacitor 142 is again energized through the operated one of the contacts AR30 and HR30, the coil KA, and the contact KB1C. The resulting stepping pulse applied to the path 124 through the operated one of the contacts AR20 and HR20 moves the platform 32 and the contact arm 138a one position to the left, wherein the switch 137a remains closed through the second contact 141 and again completes a charging path for the capacitor 142. A second stepping pulse is thus applied to the path 124 so that the platform 32 and the contact arm 138a are each indexed again into their leftmost positions. In this position, the switch 137a is opened and the charging path for the capacitor 142 is disabled so that no further movement of the platform 32 can occur.

In the event that the permitted maximum of four shots must be employed to complete the trimming operation, both the platform 32 and the ganged switches 137 will have been advanced three positions to the right by the resistor indexer 126 during the trimming operation. Assuming that the ACCEPT or HIGH range has been reached at the end of the fourth shot, the switch 137a (which is now in its rightmost position) completes the charging path for the capacitor 142 through the operated one of the contacts AR30 and HR30 as before. Thus, a stepping pulse is applied to the path 124 through the operated one of the contacts AR20 and HR20 to move the platform 32 and the contact arm 138a one step to the left. Since the switch 137a remains closed through the third contact 141 in this position, the capacitor 142 recharges and a second pulse is applied to the path 124 to index the platform 32 and the contact arm 138a again. In the new position, the switch 137a is closed through the second contact 141 and the capacitor 142 is charged again. A third indexing movement is thereby effected to bring the platform 32 and the contact arms 138 into their leftmost positions. At this time, the switch 137a is opened and the reset operation is complete.

It will be recalled that if the ACCEPT or HIGH range is not reached at the end of the fourth laser shot, the trimming operation is nevertheless terminated by the energizing of the coil P through the now-closed switch 137c, the open AND gate 149, and the operated contact Q10. The energizing of the coil P causes the latter coil to be locked-up between a source 151 and ground by operating a contact P30. Thus, as long as the contact Q10 remains operated, the coil P will remain enabled to operate a pair of transfer contacts P10–P1C (in the paths 124 and 123, respectively) and a contact P20 (in series with the switch 137a).

When the coil P is energized, therefore, a charging path is completed from the source 143 to ground for the capacitor 142 via the switch 137a, the operated contact P20, the coil KA, and the contact KB1C. This will provide a stepping pulse to the path 124 through the operated contact P10. The resistor reset indexer 114 (FIG. 1) will thereupon step the platform 32 and the contact arms 138 (FIG. 13) one position to the left. The switch 137a remains closed in this position through its third contact 141, and consequently the coil Q remains energized to maintain the locked-up condition of the coil P. The capacitor 142 charges again through the closed switch 137a and the operated contact P20, and the resulting second stepping pulse to the path 124 effects a second indexing movement to the left of the platform 32 and the contact arm 137a. In this new position, the coil Q remains energized and the capacitor 142 is charged yet another time through the switch 137a and the still-operated contact P20. A third stepping pulse is now applied to the path 124 to bring the platform 32 and the contact arm 138a into their leftmost positions. At this time, the switch 137a is opened and disables the charging path for the capacitor 142, so that the platform 32 remains in its leftmost position shown in FIG. 1. In addition, the coil Q (FIG. 13) is deenergized to release the contact Q10 in the lock-up path of the coil P. The latter is thereby deenergized and releases the contacts P10 and P20.

The switch 137d in the resistor positioner 126 is not employed directly in the indexing and reset operations discussed above for the platform 32. The operation of the switch 137d will be considered below in connection with the iris adjusting functions of the iris positioner 132 (FIG. 1) and the programmed controller 133.

As indicated before, the iris positioner 132 initially supplies stepping pulses to the iris position indexer 118 to discretely move the iris opening from the maximum, or reset, value to one of four successively smaller values (hereafter designated values 1, 2, 3, and 4 for simplicity) individually corresponding to the successively higher resistor trim ranges 1, 2, 3, and 4 employed in the automatic mode.

For purposes of convenience, the interrelationship among the initial resistance range, the resistor index position, and the iris opening in the automatic mode is summarized in Table 4 below.

TABLE 4

| Initial resistance range | Initial iris opening value | Iris opening value after 3rd shot if range 3 or 4 is reached |
|---|---|---|
| LOW | Maximum | |
| 1 | 1 | 3 |
| 2 | 2 | 3 |
| 3 | 3 | 3 |
| 4 | 4 | 4 |
| ACCEPT | Maximum | Maximum |
| HIGH | Maximum | |

Table 4 indicates that when a resistor initially falling in range 1 or range 2 is to be trimmed, the iris opening will be initially set to value 1 or value 2, respectively. The set value is thereafter maintained for the remainder of the trimming operation unless the resistor reaches range 3 or range 4 at the end of the third laser shot. In the latter case, the iris opening is reduced to value 3 in preparation for the fourth shot.

Where the resistor initially falls in range 3 or range 4, the iris opening will be initially placed in the associated value 3 or 4, respectively, and will be held in that setting throughout the trimming operation. For resistors initially in the LOW, HIGH, or ACCEPT range no trimming is called for and the iris will remain at its reset value.

To instrument the relationships of Table 4, the iris positioner 132 is arranged, as described below, to apply from one to four stepping pulses to the iris position indexer 118. Assuming that the iris is initially at its reset or maximum value, the application of one pulse to the indexer 118 will step the iris opening to value 1; two pulses in succession will step the iris opening to value 2; three pulses in succession, to value 3; and four pulses in succession to value 4. Where changes in the iris setting are required after the third laser shot, the positioner 132 will supply either one or two additional pulses to the indexer 118 at that time to step the iris from value 1 or value 2, respectively, to value 3.

The number of stepping pulses necessary to set the appropriate iris value are obtained by interconnecting the path 134 with one of a plurality of five terminals 153a–e selected by the controller 133.

The terminals 153a–e are individually connected to a plurality of fixed contacts 154a–e (FIG. 14) associated with an insulated contact block 156 of a stepping switch 157. The switch 157 is provided with a movable contact arm 158 that is electrically connected to a source 159. The contact arm 158 is mechanically coupled to the beam shaper 67 (FIG. 1) via a link 161 so that the arm 158 (FIG. 13) may be advanced one position to the right each time the indexer 118 (FIG. 1) steps the iris opening in the shaper 67 to the next higher value and, conversely, so that the contact arm may be advanced one position to the left each time the iris reset indexer 119 steps the iris opening to its next lower value. It is assumed that the leftmost contact 154a (FIG. 14) is in engagement with the contact arm 158 when the iris opening is at its maximum value, and the remaining four contacts 154b–154e to the right are individually in engagement with the contact arm 158 when the iris is in successively smaller ones of its discrete values 1–4 as called for in Table 4.

The particular terminal 153 that is selected for interconnection with the path 134 determines the initial value of the iris opening. Thus, if the leftmost terminal 153a is selected for interconnection, the iris will not be stepped and will remain at its maximum or reset value. If the next succeeding terminal 153b to the right is selected, the iris will be stepped to value 1. If the terminal 153c is selected, the iris will be stepped to value 2; and so forth.

Each interconnection of a terminal 153 with the path 134 conditions a charging path from the source 159 to ground for a capacitor 162 via the switch 157, the interconnected terminal 153 and path 134, a coil KC and, a contact KD1C.

The required interconnection between the selected one of the terminals 153 and the path 134 at the start of a trimming operation is accomplished in the controller 133 (FIG. 15) through the operation of an associated one of a plurality of sets of transfer contacts 1S10–1S1C, 2S10–2S1C, 3S10–3S1C, and 4S10–4S1C. Such operation results, in turn, from the energizing of a corresponding one of a plurality of coils 1S, 2S, 3S, and 4S in the controller. In particular, the terminal 153a is coupled to the path 134 through an enabled one of the contacts 1S10, 2S10, 3S10, and 4S10. The terminals 153b, 153c, and 153d are respectively coupled to the path 134 through the contacts 1S1C, 2S1C, 3S1C, and 4S1C, respectively.

An additional pair of transfer contacts 1AS10–1AS1C and 2AS10–2AS1C are provided for effecting a change of iris value at the end of the third laser shot where required by Table 4. The contacts 1AS10 and 2AS10 are each connected in parallel with the contact 3S10, and the contacts 1AS1C and 2AS1C are each connected in series with the contact 3S1C.

The manner of generating stepping pulses in the iris positioner 132 (FIG. 1) is generally similar to that of the resistor positioner 126. When a charging path for the capacitor 162 is enabled by the operation of one of the transfer contacts jS10–jS1C, (FIG. 15) (where j may represent 1, 2, 3, 4, 1A, or 2A), the initial charging current energizes the coil KC. The latter operates a contact KC1C to isolate a coil KD from the charging path. Because of the exponential decay of the charging current for the capacitor 162, the coil KC is deenergized after a prescribed interval and the contact KC1C is released to permit the discharge of the capacitor 162 to ground through the coil KD. The latter operates a contact KD10 in the discharge path of a capacitor 163, which at all other times is maintained charged from the source 159 through a resistor 164 and a contact KD2C. The discharge of the capacitor 163 when the contact KD10 is operated provides a stepping pulse to the path 129 through one of a second set of transfer contacts jS20–jS2C, which are operated simultaneously with the operation of the transfer contacts jS10–jS1C (FIG. 15).

The manner in which the controller 133 regulates the iris positioner 132 (FIG. 1) may best be considered by assuming that an untrimmed resistor 22 initially falling in range 1 is placed in the resistor platform 32, so that the range coil 1R (FIG. 9) in the classifier 38 is energized. The optical beam generator 23 is assumed to be deactivated at this time. The iris opening is initaially at its reset or maximum value, so that the stepping switch 157 (FIG. 14) in the iris positioner 132 is in its leftmost position. Also, the platform 32 (FIG. 1) and the stepping switches 137 (FIG. 13) in the resistor positioner 126 are in their leftmost position as shown in the respective figures. In this position, the stepping switch 137d interconnects the pair of paths 136a and 136b associated with the controller 133.

The energizing of the range coil 1R (FIG. 9) operates a contact 1R20 (FIG. 15) in the controller 133 and completes an energizing path, from a source 166 to ground, for the coil 1S through the now-interconnected paths 136a–136b, the operated contact 1R20, a contact 1AS3C, and a plurality of serially connected contacts AR3C, HR3C, P2C, and LR1C.

The energizing of the coil 1S operates a normally open contact 1S40 serially connected therewith to lock up the coil 1S between the source 166 and ground through the operated contact 1S40, the contact 1AS3C, and the serial contacts AR3C, HR3C, P2C, and LR1C. This lock-up will maintain the coil 1S energized when (a) the interconnection between the paths 136a and 136b is broken and (b) the range coil 1R20 in series with the coil 1S is released (as when the resistance of the element under test is no longer in range 1).

Figure 14:
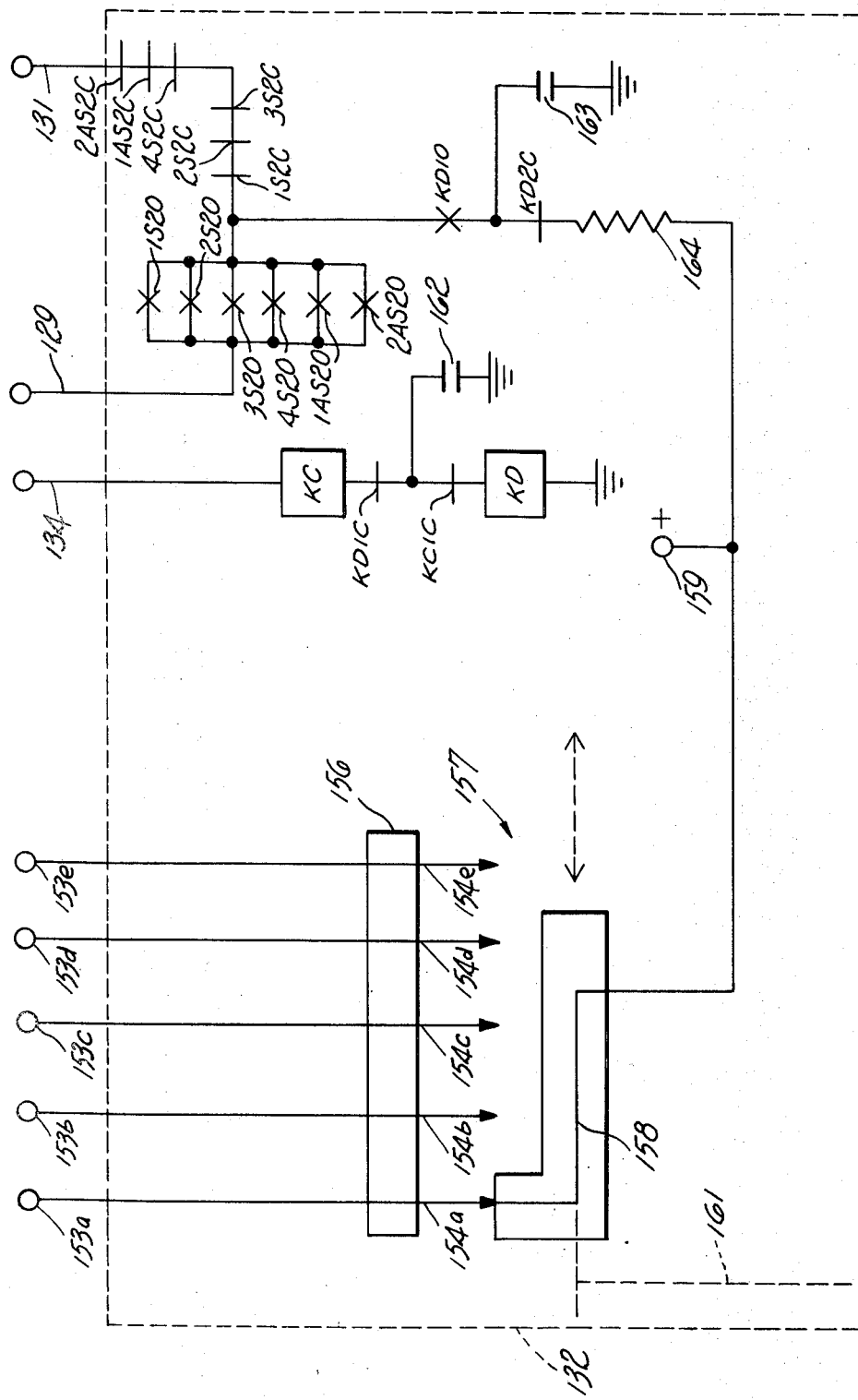
FIG. 14 is a schematic diagram of an iris positioner suitable for use in the arrangement of FIG. 1.

The energizing of the coil 1S also operates the transfer contacts 1S10–1S1C and 1S20–1S2C (FIG. 14). As a result, a charging path for the capacitor 162 is completed through the source 159, the switch 157, the terminal 153*a*, the operated contact 1S10 (FIG. 15), the path 134, the coil KC (FIG. 14), and the contact KD1C. This initiates the generation of a single stepping pulse which is applied to the path 129 via the operated contact 1S20 in the manner indicated above.

In response to this pulse, the iris position indexer 118 (FIG. 1) steps the iris opening down from its reset value to value 1. This movement of the iris advances the contact arm 158 (FIG. 14) in the iris positioner 132 one position to the right so that the switch 157 interconnects the source 159 with the terminal 153*b*. Since the contact 1S1C (FIG. 15) is operated, however, the terminal 153*b* is decoupled from the path 134 and the capacitor 162 (FIG. 14) cannot charge. Thus, no further stepping pulses will be generated by the iris positioner 132, and the iris opening will remain at value 1 as required by Table 4.

Assume now that the platform 32 (FIG. 1), the switch 157 (FIG. 14), and the switches 137 (FIG. 13) are again set in their initial or leftmost positions and the resistor under test is initially in range 3. Thus, the range coil 3R (FIG. 9) rather than the coil 1R, will be energized. The resulting operation of the normally open contact 3R20 (FIG. 15) in the controller 133 will enable an energizing path, from the source 166 to ground, for the coil 3S through the interconnected paths 136*a* and 136*b*, the operated contact 3R20, and the contacts AR3C, HR3C, P2C, and LR1C.

The energizing of the coil 3S operates a normally open contact 3S40 in series therewith and completes a lockup path from the source 166 to ground for the coil 3S. The energizing of the coil 3S also operates the transfer contacts 3S10–3S1C in the controller and the transfer contacts 3S20–3S2C (FIG. 14) in the path 129.

The operated contact 3S10 (FIG. 15) interconnects the terminal 153*a* with the path 134 and, since the switch 157 now couples the source 159 to the terminal 153*a*, a charging path is established for the capacitor 162. As a result, a first stepping pulse is applied to the path 129 through the now-operated contact 3S20. The iris position indexer 118 (FIG. 1) thereupon steps the iris opening down from its reset value to value 1.

The indexer 118 simultaneously advances the contact arm 158 (FIG. 14) of the stepping switch 157 one position to the right. In this position, the switch 157 interconnects the source 159 with the terminal 153*b* and completes another charging path for the capacitor 162 through the unoperated contact 1S1C (FIG. 15) and the path 134. Therefore, a second stepping pulse is applied to the path 129 (FIG. 14) through the operated contact 3S20. The indexer 118 (FIG. 1) steps the iris opening down from the value 1 to value 2 and simultaneously advances the contact arm 158 (FIG. 14) another position to the right so that the switch 157 now interconnects the source 159 with the terminal 153*c*. In this position, the capacitor 162 can again charge from the source 159 through the unoperated contact 2S1C (FIG. 15). A third stepping pulse is therefore applied to the path 129 (FIG. 14) through the operated contact 3S20. The indexer 118 (FIG. 1) thereupon steps the iris opening down again from value 2 to value 3 and indexes the contact arm 157 (FIG. 14) so that the switch 158 now interconnects the source 159 and the terminal 153*d*.

In this position, the operated contact 3S1C (FIG. 15) decouples the terminal 153*d* (FIG. 14) from the path 134 and isolates the capacitor 162 from the source 159, so that the capacitor cannot charge. No further stepping pulses are generated in the iris positioner 132, and the iris opening correspondingly remains at the value (i.e., value 3) associated with the initial resistance range 3 of the element under test.

The iris setting procedure when the initial resistance of the element under test falls in range 2 or range 4 will be analogous to the above-described procedure for range 1 and range 3. Thus, for range 2 or range 4 operation, the iris positioner 132 will be directed by the controller 133 (FIG. 1) to initially step the iris down to value 2 or value 4, respectively.

If the initial resistance of the element under test falls in the LOW, HIGH, or ACCEPT range, none of the transfer contacts *j*S10–*j*S1C (FIG. 15) interconnecting the terminals 153 with the path 134 will be operated. Hence, no charging path for the capacitor 162 (FIG. 14) is established and no stepping pulses can be generated by the iris positioner 132. The iris opening will therefore remain in its reset value.

The controller 133 (FIG. 1) is responsible for directing the iris positioner 132 to perform two additional iris control functions: (a) stepping the iris opening down from value 1 or 2 to value 3 after the third laser shot in the situation called for in Table 4 and (b) stepping the iris opening back up to its reset value after the conclusion of a trimming operation.

The manner in which the iris opening is stepped down to a lower value after the third laser shot in an appropriate case will first be described. It will be assumed that the resistor under test was initially in range 1 and that the iris position indexer 118 had positioned the iris opening to value 1 prior to the start of the trimming operation in the manner indicated above. It will be further assumed that two laser shots have already been taken and that the third laser shot to be taken will increase the resistance of the element under test to range 3. According to Table 4, therefore, the iris opening must be stepped down from value 1 to value 3 after the third shot.

To summarize the conditions that exist before the third shot in this case, it will be recalled that since the initial resistance of the element was in range 1, the coil 1S in the controller 133 (FIG. 15) is energized and locked-up so that the transfer contacts 1S10–1S1C and 1S20–1S2C (FIG. 14) are in their operated condition. At this time, therefore, the stepping switch 157 is in the position corresponding to the value 1 setting of the iris opening i.e., in the position interconnecting the source 159 with the terminal 153*b*. In addition, the ganged stepping switches 137 (FIG. 13) in the resistor positioner 126 are in their third position in preparation for the third laser shot. In this position, the switch 137*d* is open and the paths 136 associated with the controller 133 are mutually decoupled.

Upon the occurrence of the third laser shot, the resistance of the element under test reaches the assumed range 3. The resistor positioner 126 thereupon indexes the resistor mounting platform 32 to its fourth and rightmost position, and simultaneously advances the contact arm 138*d* to its rightmost position. In this position the switch 137*d* is closed and interconnects the paths 136*a* and 136*c*. Moreover, as a result of the third shot, the range coil 3R (FIG. 9) in the classifier 38 is energized and operates a set of contacts 3R20, 3R30, and 3R40 (FIG. 15) in the controller 133. An energizing path from the source 166 to ground for the coil 1AS is now completed through the now-interconnected paths 136*a* and 136*c*, a contact 1S50 (operated by the locked-up coil 1S), the operater contact 3R30, and the serial contacts AR3C, HR3C, P2C and LR1C.

The energizing of the coil 1AS (a) terminates the locked-up condition of the coil 1S by operating the normally closed contact 1AS3C in the energizing path of the coil 1S and (b) operates a contact 1AS30 in series with the coil 1AS to lock-up the latter coil between the source 166 and ground through the contacts AR3C, HR3C, P2C, and L1C.

The termination of lock-up of the coil 1S releases the transfer contacts 1S10–1S1C in the controller and the transfer contacts 1S20–1S2C (FIG. 14) in the iris positioner 132. The commencement of lock-up of the coil 1AS (FIG. 15), in turn, operates the transfer contacts 1AS10–1AS1C in the controller and the transfer contacts 2AS10–2AS1C (FIG. 14) in the iris positioner. The terminal 153b, which is coupled to the source 159 through the switch 157, is now interconnected with the path 134 through the released contact 1S1C (FIG. 15) to complete a charging path for the capacitor 162 (FIG. 14). A stepping pulse is therefore generated and applied to the path 129 through the now-operated contact 2AS10 (FIG. 15). The resistor position indexer 118 (FIG. 1) steps the iris opening down from its value 1 to value 2 and simultaneously indexes the contact arm 158 (FIG. 14) one position to the right so that the switch 157 interconnects the source 159 with the terminal 153c.

In this latter position, the source-coupled terminal 159c is connected to the path 134 by the unoperated contact 2S1C. Thus, a second stepping pulse is initiated and applied to the path 129 (FIG. 14). The indexer 118 (FIG. 1) thereupon steps the iris down from value 2 to value 3 and simultaneously indexes the contact arm 158 (FIG. 14) one more position to the right so that the switch 157 couples the source 159 to the terminal 153d. Because of the now-operated condition of the contact 1AS1C, the path 134 is isolated from the source-connected terminal 153d and the capacitor 162 cannot recharge. Thus, no further stepping pulses will be generated by the iris positioner 132 and the iris opening will remain at the required value 3 for the remainder of the trimming operation.

The controller 133 (FIG. 15) may also direct the iris positioner 132 (FIG. 14) to step the iris opening down from value 1 to value 3 when the resistor reaches range 4, rather than range 3, at the termination of the third laser shot. This is accomplished through the operation of a contact 4R30 (FIG. 15) in parallel with the contact 3R30 in a manner analogous to that just described. Also, where the initial resistance is in range 2 rather than range 1, the iris may also be stepped down from value 2 to value 3 when range 3 or 4 is reached after the third laser shot in accordance with Table 4. This is accomplished by utilizing a coil 2AS and a set of contacts 3R40, 4R40, 2S50, and 2AS30 in the controller 133 in a manner analogous to the above-decsribed use of the coil 1AS and the contacts 3R30, 4R30, 1S50, and 1AS30, respectively.

The reset stepping operation for the iris opening after the trimming operation is complete will now be explained by considering the case where the iris opening is initially set to value 3 and is held there throughout the trimming operation. In this case, the iris opening must be stepped up from value 3 to the reset value at the conclusion of trim by three stepping pulses generated in the iris positioner 132 (FIG. 1) and applied to the iris reset indexer 119 via the path 131.

It will be recalled from the previous discussion that when the iris opening is set at value 3, the coil 3S (FIG. 15) in the controller 133 is energized and locked-up so that the transfer contacts 3S10–3S1C in the controller and the transfer contacts 3S20–3S2C (FIG. 14) in the iris positioner 132 are operated. Accordingly, the switch 157 interconnects the source 159 with the terminal 153d.

The conclusion of the trimming procedure will be indicated, as before, by the energizing of one of three coils: AR or HR (FIG. 9) and P (FIG. 13). The energizing of one of these coils will operate a corresponding one of the serial contacts AR3C (FIG. 15), HR3C, and P2C in the energizing path of the coil 3S and will terminate its locked-up condition.

As a result, the transfer contacts 3S10–3S1C in the controller will be released and the source-coupled terminal 153d (FIG. 14) will now be interconnected with the path 134.

A stepping pulse will therefore be generated by the positioner 132 and, since the disabling of the coil 3S (FIG. 15) also releases the contacts 3S20–3S2C (FIG. 14) in the iris positioner, this stepping pulse will be applied to the path 131 rather than the path 129.

The stepping pulse causes the iris reset indexer 119 (FIG. 1) to step the iris up from value 3 to value 2 and simultaneously indexes the contact arm 158 (FIG. 14) one position to the left. In this position, the switch 158 couples the source 159 to the terminal 153c. The latter terminal is interconnected with the path 134 through the unoperated contact 2S1C to complete a charging path for the capacitor 162. Thus, a second stepping pulse is applied to the path 131. The iris opening is therefore stepped up from value 2 to value 1 and the contact arm 158 is indexed again so that the switch 157 couples the source 159 to the terminal 153b. Since the latter terminal is interconnected with the path 134 through the unoperated contact 1S1C, the capacitor 162 charges again and initiates a third stepping pulse that is applied to the path 131 in the manner indicated above. This time the indexer 119 steps the iris from value 1 to its reset value, and moves the switch 157 into its leftmost position, so that the latter interconnects the source 159 and the terminal 153a. Since none of the contacts 1S10–4S10, (FIG. 15) 1AS10, and 2AS10 interconnecting the terminal 153a and the path 134 are operated at this time, the capacitor 162 cannot charge again and no more stepping pulses will be applied to the path 131. Thus, the iris opening comes to rest at its reset value.

It will be apparent that the iris opening may be stepped back to its reset value from any of its other possible values (i.e., 1, 2, and 4) after the trimming operation in an analogous manner.

Overall operation-automatic mode

A complete four-shot trimming operation for an untrimmed range 1 resistor will now be described to illustrate the employment of the apparatus of FIGS. 1–15 in the automatic mode. It will be assumed that the resistor under test reaches range 2 at the end of the first laser shot, range 3 at the end of the second shot, range 4 at the end of the third laser shot (thereby triggering an iris step-down in accordance with Table 4), and the ACCEPT range at the end of the fourth shot.

Prior to the start of the trimming operation, the switch 103 (FIG. 9) in the classifier 38 is placed in its automatic position so that the energizing path for the range coils LR, 1R, 2R . . . iR . . . 7R, AR, and HR includes a pair of parallel, normally open contacts Q1C and OP30. Also, the trigger switch 61 (FIG. 1) is set in its automatic position. The switches 137 (FIG. 13) in the resistor positioner 126 and the switch 157 (FIG. 14) in the iris positioner 132 are respectively in their leftmost positions. As a result, the resistor mounting platform 32 (FIG. 1) is in its leftmost position, and the iris opening in the shaper 67 is set at its maximum value.

When the resistor 22 to be trimmed is placed in the platform 32, operation in the automatic mode is initiated by depressing a push button 167 (FIG. 15) in the controller 133 to complete an energizing path, from the source 166 to ground, for a coil OP through the unoperated serial contacts AR3C, HR3C, P2C, and LR1C. The enabled coil OP is immediately locked-up by operating a serial contact OP40 so that the push button 167 may be released without deenergizing the coil OP.

The enabling of the coil OP operates the contact OP30 (FIG. 9) in the classifier 38. Since the resistor under test is initially in range 1, an energizing path is established, from the source 102 to ground, for the range coil 1R through the operated contact OP30 and the sorting circuit 101.

At this time, the stepping switch 137d (FIG. 13) in the resistor positioner 126 is closed through its leftmost contact 141 to interconnect the paths 136a and 136b to the controller 133. As a result, the enabling of the range coil 1R (FIG. 9) energizes and locks up the coil 1S (FIG. 15). The latter operates the transfer contacts 1S10–1S1C and 1S20–1S2C (FIG. 14). The operated contact 1S10 (FIG. 15) interconnects the source-coupled terminal 153a with the path 134 and completes a charging path for the capacitor 162 (FIG. 14). A stepping pulse is thereupon applied to the path 129 through the operated contact 1S20. The indexer 118 (FIG. 1) steps the iris opening down from the reset value to value 1 and simultaneously indexes the switch 157 (FIG. 14) one position to the right and into engagement with the terminal 153b. The iris opening will remain at value 1 since the operated condition of the contact 1S1C (FIG. 15) isolates the terminal 153b from the path 134 and prevents the application of any further stepping pulses to the indexer 118 (FIG. 1) at this time.

The operation of the coil OP (FIG. 15) in the controller 133 also energizes the laser trigger contacts OP10 (FIG. 1) and OP20 (FIG. 13). Because of the delay inherently provided by the pulse-generating network 63 (FIG. 1), the trigger circuit 58 is not energized by the source 59 through the operated contact OP10 until after the iris opening is stepped down from the reset value to value 1. At the end of this delay, the circuit 58 is enabled to trigger the first laser shot, which is applied to the underlying resistor 22 after being constricted into the required slot-shaped configuration by the shaper 67 and reduced in area by the sizer 89. As indicated above, the carbon strip removed by the first laser shot brings the resistor from range 1 to range 2.

Since the first laser shot did not bring the resistor into the ACCEPT or HIGH range, the enabling of the trigger circuit 58 also enables the AND gate 144 (FIG. 13) in the resistor positioner 126 via the path 127 and the operated contact OP20 after the delay provided by the circuit 128 (FIG. 1). This completes a charging path from the source 143 (FIG. 13) to ground for the capacitor 142 through the switch 137b, the gate 144, the coil KA, and the contact KB1C. A stepping pulse is thereupon generated and applied to the path 123 through the unoperated serial contacts AR2C, HR2C, and P1C.

The resistor position indexer 113 (FIG. 1) thereupon axially advances the platform 32 by an increment D to the right in preparation for the second laser shot and also indexes the stepping switches 137 (FIG. 13) one position to the right. In this position, the switch 137a energizes the coil Q and the stepping switch 137d decouples the paths 136 to the controller 133.

The resistance increase resulting from the first laser shot causes the range coil 2R (FIG. 9) to be enabled for operating the contact 2R20 (FIG. 15) in the controller 133. The coil 2S in series with the contact 2R20 will remain unenergized, however, since the paths 136 in series therewith are now decoupled. The coil 1S remains in its locked-up condition and the iris opening remains in value 1 in preparation for the second laser shot.

The second laser shot which may occur about one second after the first shot, (as initiated by the pulse-generating network 63) vaporizes the underlying region of the resistor core 24 (FIG. 1) to increase the resistance of the element to range 3. Again, since the second shot did not raise the resistor to the ACCEPT or HIGH range, the second trigger output pulse enables the AND gate 144 (FIG. 13) in the resistor positioner 126 to complete another charging path for the capacitor 142. A second stepping pulse is therefore applied to the indexer 113 (FIG. 1) through the path 123. The indexer 113 advances the platform 32 again by the increment D in preparation for the third shot, and the stepping switches 137 (FIG. 13) are indexed to their third position. In this position, the switch 137d is still open and the paths 136 are decoupled.

As a result of the second laser shot, the range coil 3R (FIG. 9) is enabled and the contact 3R20 (FIG. 15) in the controller 133 is operated. Nevertheless, the coil 3S in series with the operated contact 3R20 will remain deenergized because of the decoupled condition of the paths 136 in series therewith. The locked-up condition of the coil 1S remains unchanged.

The third laser shot (as initiated by the pulse-generating network 63) vaporizes sufficient additional carbon from the resistor 22 (FIG. 1) to raise its resistance to range 4. Since the ACCEPT or HIGH range has still not been reached, the AND gate 144 (FIG. 13) in the resistor positioner 126 is again enabled by the trigger output pulse associated with the third shot. The capacitor 142 charges again through the closed stepping switch 137b, and a third stepping pulse is applied to the indexer 113 (FIG. 1). The platform 32 is thereupon advanced a third time through the increment D, and the switches 137 (FIG. 13) are indexed to their rightmost position. In this position, the switch 137d interconnects the paths 136a and 136c associated with the controller 133.

The resistance increase of the element 22 (FIG. 1) to range 4 also energizes the coil 4R (FIG. 9) so that the contacts 4R20 and 4R30 (FIG. 15) in the controller 133 are operated. An energizing path is thereupon completed, from the source 166 to ground, for the coil 1AS through the interconnected paths 136a and 136c, the contact 1S50 (which is still operated by virtue of the lockedup condition of the coil 1S), the operated contact 4R30, and the serial contacts AR3C, HR3C, P2C, and LR1C. The energizing of the coil 1AS operates the contact 1AS30 in series therewith to lock-up the coil 1AS.

The enabling of the coil 1AS also operates the contact 1AS3C to terminate the locked-up condition of the coil 1S, thereby releasing the transfer contacts 1A10–1A1C in the controller and the transfer contacts 1A20–1A2C (FIG. 14) in the iris positioner 132. In addition, the enabling of the coil 1AS (FIG. 15) operates the corresponding transfer contacts 1AS10–1AS1C and the transfer contacts 1AS20–1AS2C (FIG. 14).

The terminal 153b (which had been coupled to the source 159 through the switch 157 for the first three shots) is interconnected with the path 134 through the now-released contact 1S1C (FIG. 15) to complete a charging path for the capacitor 162 (FIG. 14). A stepping pulse is accordingly provided to the path 129 through the now-operated contact 1AS20 (FIG. 15).

The iris positioner 118 (FIG. 1) thereupon steps the iris opening down from value 1 to value 2 and indexes the switch 157 (FIG. 14) one position to the right into engagement with the terminal 153c.

The terminal 153c is coupled to the path 134 through the unoperated contact 2S1C (FIG. 15) so that the capacitor 162 (FIG. 14) charges again. Another stepping pulse is now applied to the path 129. The indexer 118 (FIG. 1) thereupon steps the iris down from value 2 to value 3 and advances the switch 157 (FIG. 14) into engagement with the terminal 153d. Since this latter terminal is isolated from the path 134 by the now-operated contact 1AS1C (FIG. 15), no further stepping pulses are generated and the iris opening comes to rest at value 3.

The fourth laser shot (as initiated by pulse-generating network 63) taken with this new iris setting, evaporates sufficient carbon from the resistor 22 (FIG. 1) to bring the resistance of the latter into the ACCEPT range. The trimming operation is now complete, as signified by the energizing of the coil AR (FIG. 9) in the classifier 38.

The enabling of the coil AR operates the contact AR3C (FIG. 15) in the energizing paths of the coils OU and 1AS and terminates their locked-up condition. The trigger enabling contact OP10 (FIG. 1) is thereby released and prevents further laser shots. The contact OP20 (FIG. 13) in the resistor positioner 126 is likewise released to prevent further enabling of the AND gate 144.

The disabling of the coil OP (FIG. 15) also releases the contact OP30 (FIG. 9) in the classifier 38. However, since the coil Q (FIG. 14) in the resistor positioner 126 is maintained energized so long as the platform 32 is away from its leftmost position, the contact Q1C (FIG. 9) in parallel with the released contact OP30 will remain operated to maintain the energized condition of the coil AR.

The disabling of the coil 1AS (FIG. 15) in the controller 133 releases the transfer contacts 1AS10–1AS1C in the controller 133 and the transfer contacts 1AS20–1AS2C (FIG. 14) in the iris positioner 132. Since the source-coupled switch 157 is now in series with the terminal 153d, the release of the contact 1AS1C (FIG. 15) reestablishes the charging path of the capacitor 162 (FIG. 14) and causes the iris positioner 132 to generate another stepping pulse. This pulse is applied to the path 131 rather than to the path 129 because of the release of the contact 1AS2C (FIG. 15).

The iris reset indexer 119 (FIG. 1) thereupon steps the iris opening up from value 3 to value 2 and advances the switch 157 (FIG. 14) in the iris positioner 132 one position to the left and into engagement with the terminal 153c. In this position, the source-coupled terminal 153c is interconnected with the path 134 through the unoperated contact 2S1C (FIG. 15), and a second stepping pulse is applied to the path 131.

This pulse steps the iris opening up again from value 2 to value 1 and simultaneously advances the switch 157 (FIG. 14) to the left and into engagement with the terminal 153b. Since the latter terminal is coupled to the path 134 through the unoperated contact 1S1C (FIG. 15), another stepping pulse is applied to the path 131 (FIG. 14). The indexer 119 (FIG. 1) thereupon steps the iris opening up to its maximum or reset value and moves the switch 157 (FIG. 14) into its leftmost position in engagement with the terminal 153a. Because of the unoperated condition of all the transfer contacts j10–j1C (FIG. 15) at this time, the terminal 153 is isolated from the path 134 and no further stepping pulses will be generated by the iris positioner 132 (FIG. 14). The iris opening will therefore remain at its reset value.

The termination of the trimming operation also commences the reset indexing operation of the resistor mounting platform 32. In particular, the energizing of the coil AR (FIG. 9) operates the contact AR30 (FIG. 13) in series with the closed stepping switch 137a (which is in its rightmost position at the end of the trim) and also operates the transfer contacts AR20–AR2C in the discharge path of the capacitor 146. As a result, a charging path is completed for the capacitor 142 from the source 143 to ground through the switch 137a, the operated contact AR30, the coil KA, and the contact KB1C. A first stepping pulse is therefore applied to the path 124 through the now-operated contact AR20. The resistor reset indexer 114 (FIG. 1) axially advances the platform 32 to the left by the increment D and moves the stepping switches 137 (FIG. 13) one position to the left. Since the switch 137a remains closed, the capacitor 142 charges again and a second stepping pulse is applied to the path 124. The indexer 114 (FIG. 1) thereupon advances the platform 32 by another increment D to the left and indexes the stepping switch 137a (FIG. 13) one more position in the same direction. In this position, the switch 137a still remains closed, the capacitor 142 charges again, and a third stepping pulse is applied to the path 124.

The indexer 114 (FIG. 1) now advances the platform 32 a final increment D to the left into its initial or reset position shown in FIG. 1. At the same time, the stepping switch 137a (FIG. 13) is moved into its leftmost and open position to decouple the coil Q and the capacitor 142 from the source 143.

The disabling of the coil Q releases the contact Q1C (FIG. 9) in the classifier 38 and disables the ACCEPT coil AR. The resultant release of the contacts AR20 and AR30 (FIG. 13) prevents any more stepping pulses from being generated and applied to the bi-directional motor 48 and the platform 32 comes to rest in its reset position shown in FIG. 1.

If the resistor under test initially falls in the LOW, ACCEPT, or HIGH range so that one of the coils LR, AR, and HR (FIG. 9) in the classifier 38 is energized after the push button 167 (FIG. 15) is depressed, no trimming operation will occur. This is because the energizing of one of these coils LR, AR, and HR (FIG. 9) will operate one of the serial contacts LR1C, AR3C, and HR3C (FIG. 15) in the energizing path of the coil OP and will terminate the lock-up condition of the coil OP virtually as soon as such condition is established. By providing suitable release-delay means (not shown) in the indicator lamp contacts LR10, AR10, and HR10 (FIG. 9) a visual indication of the range in which the "untrimmable" resistor fell may be maintained on one of the lamps LM, AM, and HM after the coil OP is disabled.

It will be understood that the above-described resistance trimming apparatus, the methods of using them in both the manual and automatic mode, and the core configuration of the trimmed resistor are merely illustrative of the principles of the invention. Many other variations and modifications will now occur to those skilled in the art. These and many other modifications may be accomplished without departing from the spirit and scope of the invention.

What is claimed is:

1. In a method of altering the resistance of an elongated coated film resistor that is encapsulated in an optically transparent material by irradiating the film with a high intensity short duration optical beam, the improvement which comprises:
   performing the irradiation step with an optical beam having an elongated strip-like cross section whose longer dimension is oriented perpendicular to the resistor axis, the beam having sufficient energy to evaporate and remove a correspondingly shaped strip of film from the resistor.

2. In a method of optically evaporating selected film portions from an elongated coated film resistor that is encapsulated in an optically transparent material, the steps of:
   directing at a first peripheral region of the resistor a first high intensity, short duration optical beam having a first strip-like cross section whose longer dimension is perpendicular to the resistor axis for evaporating a correspondingly shaped first strip of the film from the first region; and
   directing, at a second peripheral region of the resistor axially spaced from the first peripheral region, a second high intensity, short duration optical beam having a second strip-like cross section whose longer and shorter dimensions are respectively parallel to the corresponding dimensions of the first beam for evaporating a correspondingly shaped second strip of the film from the second region.

3. A method as defined in claim 2, in which the directing steps are accomplished with coextensive first and second beams.

4. A method as defined in claim 2, in which the directing steps are accomplished with the longer dimension of the second beam being shorter than the longer dimension of the first beam.

5. A method as defined in claim 2, in which the second directing step is performed after the first directing step.

6. In a method of adjusting the resistance of an elongated, glass-encapsulated coated film resistor by subjecting selected portions of the film to irradiation through the encapsulation, the steps of:
   relatively positioning the resistor and a rectilinear optical path to intersect the path and a first peripheral region of the resistor;
   directing, along the path and toward the first region, a first high intensity short duration optical beam having a first strip-like cross section whose longer dimension is perpendicular to the resistor axis, the first beam having sufficient energy to evaporate and remove a correspondingly shaped strip of film from the resistor;

relatively repositioning the resistor and the optical path to intersect the path and a second peripheral region of the resistor axially spaced from the first region; and directing, along the path and toward the second region, a second high intensity short duration optical beam having a second strip-like cross section whose longer dimension is parallel to the longer dimension of the first beam, the second beam having sufficient energy to evaporate and remove a correspondingly shaped strip of film from the resistor.

7. In a method of adjusting the resistance of an elongated, glass-encapsulated coated film resistor by optically evaporating selected portions of the film through the encapsulation, the steps of:

orienting the resistor so that its axis intersects a rectilinear optical path at right angles;

axially positioning the oriented resistor to bring a first region of its periphery into registration with the path;

directing, along the path and toward the first region, a first short duration high intensity optical beam having a first strip-like cross section whose longer dimension is oriented perpendicular to the resistor axis;

axially advancing the resistor by a predetermined increment to bring a second region of its periphery into registration with the path; and directing, along the path and toward the second region, a second short duration high intensity optical beam having a second strip-like cross section whose longer and shorter dimensions are respectively parallel to the corresponding dimensions of the first beam.

8. A method as defined in claim 7, in which the directing steps are performed with the shorter dimensions of the first and second cross sections being equal.

9. A method as defined in claim 7, in which the directing steps are performed with the longer dimensions of the first and second cross sections being equal.

10. A method as defined in claim 7, in which the directing steps are performed with the longer dimension of the second cross section being shorter than the longer dimension of the first cross section.

11. In a method of adjusting the resistance of an elongated, glass-encapsulated coated film resistor by optically evaporating selected portions of the film through the encapsulation, the steps of:

shaping a high intensity optical beam into a strip-like cross section of fixed width;

adjusting the strip length of the shaped beam to a first predetermined value corresponding to a preselected first length of film to be evaporated;

positioning a first peripheral region of the resistor in the path of the adjusted shaped beam with the longer dimension of the beam cross section perpendicular to the axis of the resistor;

readjusting the strip length of the shaped beam to a second predetermined value corresponding to a second preselected length of film to be evaporated; and positioning a second peripheral region of the resistor axially spaced from the first region in the path of the readjusted shaped beam with the longer and shorter dimensions of the readjusted beam respectively parallel to the corresponding dimensions of the initially adjusted beam.

12. In a method of adjusting the resistance of an elongated, glass-encapsulated coated film resistor by optically evaporating selected portions of the film through the encapsulation, the steps of:

directing a sequence of high intensity, short duration optical beams in timed succession along a rectilinear path;

shaping each successive optical beam into a strip-like cross section having a fixed shorter dimension and an adjustable longer dimension;

orienting the resistor to position the resistor axis perpendicular to the longer dimension of the beam cross section and in alignment with the path; and axially indexing the resistor through the path in the intervals between successive beams to successively expose each of a plurality of axially spaced peripheral regions of the resistor to the next succeeding beam for evaporating, from each region, a strip of film that has a fixed width and a length proportional to the longer cross-sectional dimension of the associated beam.

13. A method as defined in claim 12, in which the indexing step is performed with the longer cross-sectional dimension of the beams being held constant.

14. A method as defined in claim 12, in which the indexing step is performed with longer cross-sectional dimension of the beams being shortened in the interval between a predetermined pair of the successive beams.

15. A method of trimming an elongated resistance layer on a substrate wherein the layer is constructed of a material capable of evaporation upon being subjected to an energy beam, comprising the steps of:

generating a series of pulsed energy beams each having an adjustbale striplike cross section and containing sufficient energy to evaporate and remove a correspondingly shaped strip of resistance material when the latter is exposed to one of the beams;

orienting the layer in exposed relation to the energy beams with the longitudinal axis of the layer oriented perpendicular to the longer dimension of the beam cross section;

imparting longitudinal relative movement between the substrate and the beams to individually evaporate and remove longitudinally spaced discrete areas of the layer;

measuring the resistance value of the layer to ascertain changes in resistance due to the evaporation of the discrete areas of the layer; and reducing the longer dimension of the beam cross-section upon ascertaining a predetermining measured resistance.

References Cited
UNITED STATES PATENTS
3,388,461   6/1968   Lins _____ 29—610

JOHN F. CAMPBELL, Primary Examiner

W. I. BROOKS, Assistant Examiner

U.S. Cl. X.R.
29—621; 219—121